United States Patent [19]

Arai

[11] Patent Number: 4,887,162

[45] Date of Patent: Dec. 12, 1989

[54] FACSIMILE MACHINE HAVING RETRANSMISSION FUNCTION

[75] Inventor: Yoshihiro Arai, Hiratsuka, Japan

[73] Assignee: Ricoh Company, Ltd., Tokyo, Japan

[21] Appl. No.: 335,953

[22] Filed: Apr. 10, 1989

[30] Foreign Application Priority Data

| Apr. 19, 1988 | [JP] | Japan | 63-94412 |
| Aug. 5, 1988 | [JP] | Japan | 63-194620 |
| Aug. 15, 1988 | [JP] | Japan | 63-201958 |
| Dec. 13, 1988 | [JP] | Japan | 63-312808 |
| Jan. 11, 1989 | [JP] | Japan | 64-2772 |

[51] Int. Cl.$^4$ ............................................. H04N 1/00
[52] U.S. Cl. ................................... 358/400; 371/31; 358/434; 358/443; 358/447
[58] Field of Search ............... 358/280, 256, 284, 260, 358/257; 371/31; 382/50, 56; 341/63

[56] References Cited

U.S. PATENT DOCUMENTS 4,188,643  2/1980  Schayes et al. ...................... 358/280
4,623,936  11/1986  Urban et al. ........................ 358/284

FOREIGN PATENT DOCUMENTS 62-147842  7/1987  Japan .
63-1243    1/1988  Japan .
63-50126   3/1988  Japan .

Primary Examiner—Edward L. Coles, Sr.
Attorney, Agent, or Firm—Oblon, Spivak, McClelland, Maier & Neustadt

[57] ABSTRACT

A source facsimile machine has a function of ending a retransmission process when image data related to error-free frames cannot be received at a destination facsimile machine. The destination facsimile detects an error in each of lines of the frame and records the error-free lines. Hence, even when errors exist in the received frames, it is still possible to record the received image by recording the error-free lines. In other words, the destination facsimile can record the received image with a minimum dropout of image information caused by the errors in the received frames.

23 Claims, 26 Drawing Sheets

FIG.13A
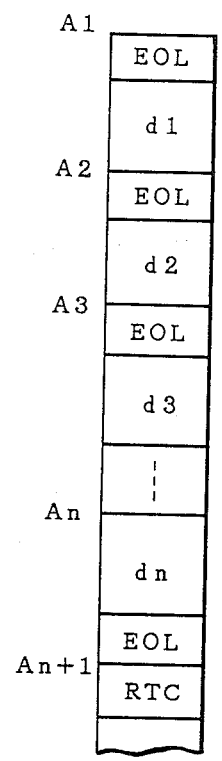
FIG.13B
| FRAME NO. | ADDRESS |
|---|---|
| 1 | A1 |
| 2 | A2 |
| 3 | A3 |
| ⋮ | ⋮ |
| n | An |
| n+1 | An+1 |
FIG.13C
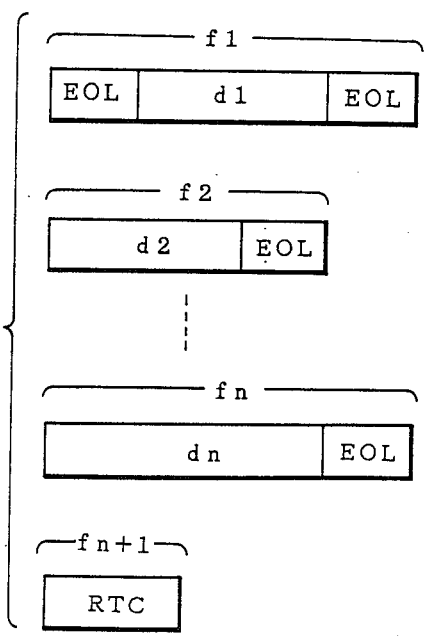

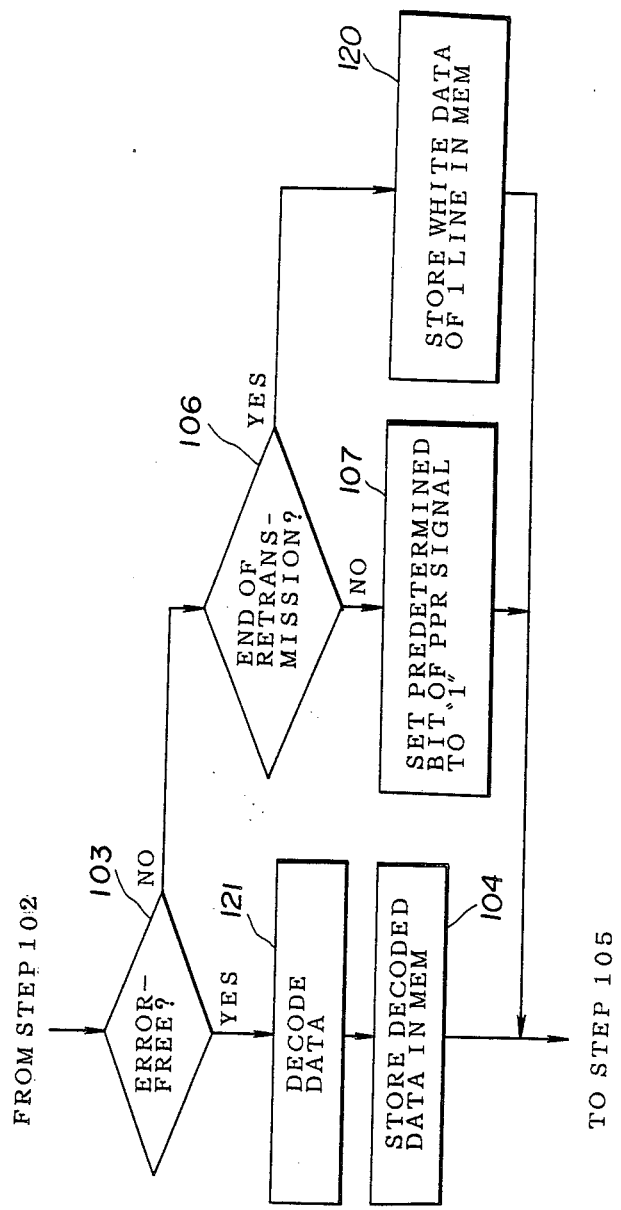

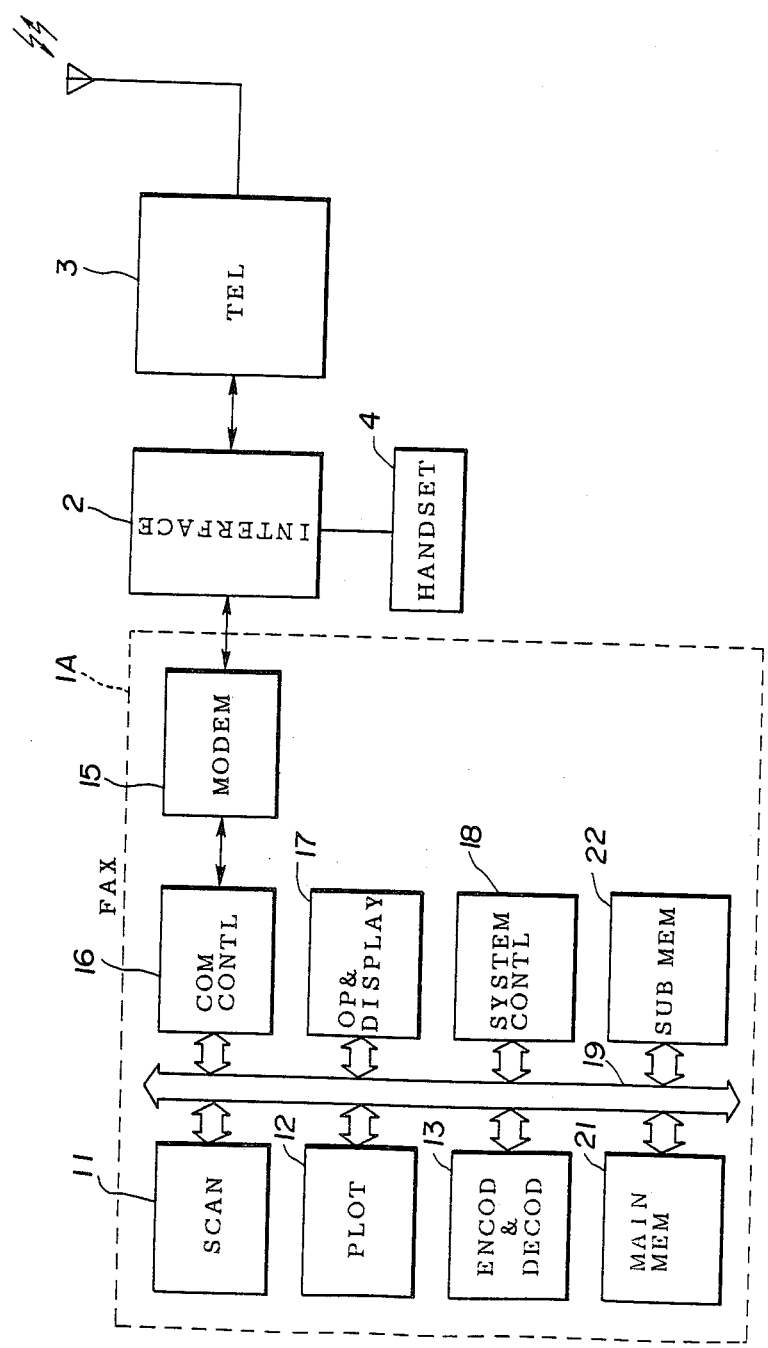

FACSIMILE MACHINE HAVING RETRANSMISSION FUNCTION

BACKGROUND OF THE INVENTION

The present invention generally relates to facsimile machines, and more particularly to a facsimile machine which has a function of retransmitting an image data when a transmission error is detected.

Conventionally, there are facsimile machines which transmit an image data in conformance with an error correction mode (ECM) of a Group III standard recommended by the CCITT. It will be assumed for convenience' sake that one page of a document shown in FIG. 1A is read on a source facsimile machine. When coded data dl through dn of first through nth lines are obtained, an end of line (EOL) code indicating an end of a line is added to each of the coded data dl through dn. The EOL code is used for synchronizing each line. According to the ECM, the 256 bytes or 64 bytes of the image data are set at a time into a high level data link control (HDLC) frame having a predetermined format, and a maximum of 256 frames are transmitted as one block of the image data.

A destination facsimile machine checks a data error in the received image data for each frame, and sends back a retransmission request to the source facsimile machine when a data error is detected so as to request a retransmission of a frame in which the data error exists. Hence, the source facsimile machine retransmits the image data of the requested frame in response to the retransmission request.

Recently, a facsimile communication is made through a mobile telephone set and a multi channel access (MCA) radio telephone set. In such a case, a radio line is used for the facsimile communication and thus a transmission error easily occurs when the state of the radio line deteriorates. Accordingly, when the facsimile communication is made in the ECM under such a condition, it becomes necessary to repeatedly retransmit the image data many times.

Generally, a data transmission rate is shifted down in the ECM every time the retransmission is repeated three times. When the retransmission is repeated three times at a minimum data transmission rate of 24000 bps, the facsimile transmission is ended. On the other hand, when the transmission is unsuccessful even when the same frame is retransmitted three times, the retransmission of this frame is discontinued and a next predetermined transmission is made such as transmitting an end signal in conformance with a protocol of the facsimile machine.

It will be assumed that the destination facsimile machine receives one page of the document in one block and the transmission of a specific frame $f_s$ is discontinued, for example. In this case, the image amounting to this specific frame $f_s$ is not recorded, but instead a blank or space, for example, is formed at a position of the erroneous frame which contains the data error as shown in FIG. 1B. Line information of a large number of lines are transmitted within one frame, but conventionally, the image corresponding to the entire frame drops out even when the data error occurs in only one line of the frame. Thus, there is a problem in this case that a length $L_1$ of the recorded image shown in FIG. 1B recorded on the destination facsimile machine is greatly reduced compared to a length $L_0$ of the original image shown in FIG. 1A transmitted on the source facsimile machine.

On the other hand, according to the ECM, one block of the image data has a data quantity of 64 kbytes when one frame has 256 bytes because one block has a maximum of 256 frames. In a case where the image data of one page of the document exceeds the data quantity of one block, this one page of the document is transmitted in divisions in a plurality of blocks as partial pages. For example, when one page of the document is transmitted in divisions in two partial pages, the retransmission may be ended during the transmission of a first partial page in a state where the error correction is not completed. In such a case, the image not only drops out in a first half of one page as shown in FIG. 1C but a latter half of this page will not be received, and there is a problem in that one page of the document cannot be recorded.

SUMMARY OF THE INVENTION

Accordingly, it is a general object of the present invention to provide a novel and useful facsimile machine in which the problems described above are eliminated.

Another and more specific object of the present invention is to provide a facsimile machine comprising modem means coupled to a data transmission path for modulating a transmitting image data which is transmitted to the data transmission path and for demodulating received image data which is received from the data transmission path, where the transmitting image data and the received image data are transmitted and received in frames respectively including image data related to a plurality of lines and error correction codes for use in detecting an error in the image data of each of the lines, communication control means coupled to the modem means for controlling communications to and from the data transmission path, reading means for reading a document image which is to be transmitted and for outputting the transmitting image data describing the document image, recording means for recording an image described by the received image data onto a recording sheet, memory means for temporarily storing the transmitting image data and the received image data, and system control means for controlling operations of the communication control means, the reading means and the recording means. The system control means includes first error detecting means for detecting an error in the received image data related to an arbitrary frame by detecting the error correction code, discriminating means for discriminating whether or not a retransmission request of the arbitrary frame is permitted, retransmission means for controlling the communication control means to output a retransmission request only when the discriminating means discriminates that the retransmission request is permitted, second error detecting means for detecting whether or not a data error exists in the image data related to the lines within the arbitrary frame for each of the lines within the arbitrary frame when the discriminating means discriminates that the retransmission is not permitted, and enabling means for enabling the recording means to record the image data related to each of the lines in which no data error is detected in the second error detecting means, so that the image data related to the arbitrary frame is recorded on the recording means even when an error is detected therein. According to the facsimile machine of the present invention, the error detection is made with respect to each of the lines within the frame when the retransmission request is not permitted and a data error is detected in the frame, and the error-free lines are successively recorded. Hence, it is possible to minimize a dropout of image information when the transmission error occurs, and it is also possible to minimize a reduction in a length of the recorded image caused by the transmission error compared to a length of the original image.

Still another object of the present invention is to provide a facsimile machine wherein the data transmission path is a radio line, said transmitting image data and said received image data are transmitted and received in frames with a data format of a high level data link control (HDLC), and a number of bytes set in one high level data link control (HDLC) frame is less than 64 bytes. According to the facsimile machine of the present invention, it is possible to reduce the data error rate when the retransmission is ended.

A further object of the present invention is to provide a facsimile machine wherein the system control means further includes first counting means for counting a number of retransmission requests received, second counting means for counting a number of retransmission requests made, first disabling means for disabling a retransmission to be made when the number in the first counting means reaches a predetermined value, where the discriminating means includes means for discriminating that the retransmission request is permitted when the number in the second counting means is less than the predetermined value, page discriminating means for discriminating whether or not one block of the received image data relates to a last partial page of the document image, and second disabling means for disabling the retransmission means by prohibiting a retransmission request to be made when the number in the second counting means is one less than the predetermined value and the page discriminating means discriminates that one block of the received image data does not relate to the last partial page of the document image, so that a next block of the image data is received. According to the facsimile machine of the present invention, it is always possible to record one page of the document image and the dropout of the image information is minimized.

Another object of the present invention is to provide a facsimile machine wherein the memory means stores the received image data related to a frame and image data related to the same frame and received in response to each retransmission request until one of the image data related to the same frame is read out and recorded on the recording means, and the system control means further includes means for reading out from the memory means portions of the image data related to the same frame in which no error is detected by the first error detecting means for being recorded on the recording means when the retransmission is ended before a error-free image data is received and detected by the first error detecting means. According to the facsimile machine of the present invention, it is possible to obtain substantially error-free image data.

A further object of the present invention is to provide a facsimile machine wherein the memory means stores the received image data related to a frame and image data related to the same frame and received in response to each retransmission request, and the system control means further includes correcting means for correcting errors in the image data stored in the memory means and for outputting a corrected image data related to the same frame for being recorded on the recording means when the retransmission is ended before an error-free image data is received and detected by the first error detecting means. According to the facsimile machine of the present invention, it is possible to correct the errors in the image data by a majority operation, for example.

Other objects and further features of the present invention will be apparent from the following detailed description when read in conjunction with the accompanying drawings.

BRIEF DESCRIPTION OF THE DRAWINGS

FIGS. 13A through 13C are diagrams for explaining data stored in a memory for explaining an operation of a third embodiment of the facsimile machine according to the present invention;

FIG. 14 is a flow chart for explaining an operation of the system control part for carrying out a reception process in the third embodiment;

FIG. 17 is a system block diagram showing a fifth embodiment of the facsimile machine according to the present invention;

DETAILED DESCRIPTION

Figure 2:
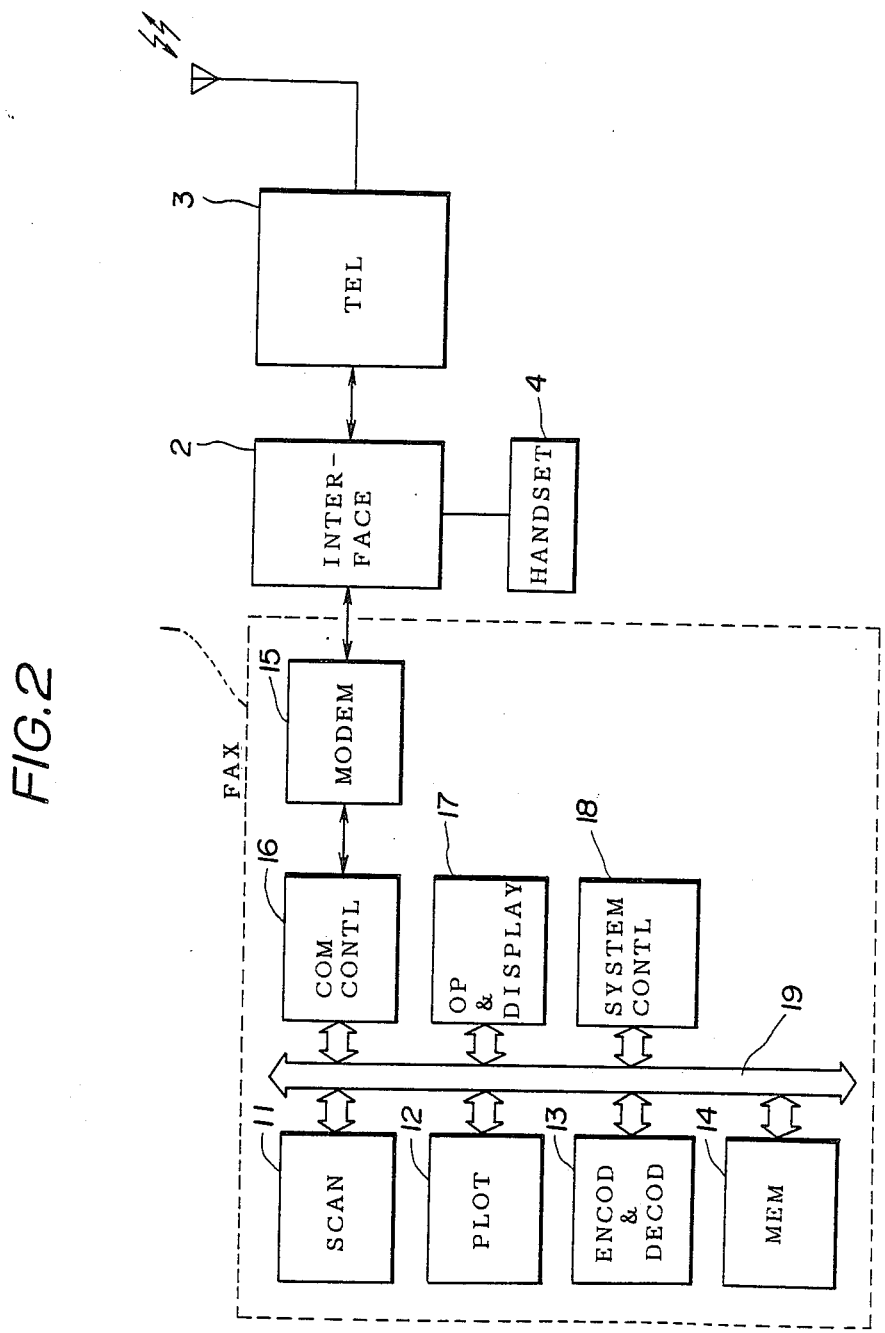
FIG. 2 is a system block diagram showing a first embodiment of a facsimile machine according to the present invention.

FIG. 2 shows a first embodiment of a facsimile machine according to the present invention. This embodiment is especially suited for use with a mobile telephone (radiophone) set. In FIG. 2, a facsimile machine 1 is coupled to a mobile telephone set 3 through an interface circuit 2. A handset 4 for controlling functions of the mobile telephone set 3 and for making a conversation is coupled to the interface circuit 2.

In the facsimile machine 1, a scanner 11, a plotter 12, an encoding and decoding part 13, a memory 14, a communication control part 16, an operation and display part 17 and a system control part 18 are coupled to each other through a bus 19. In addition, a modem 15 is coupled to the communication control part 16.

The scanner 11 reads a document image and outputs an image data having a predetermined resolution. The image data is supplied to the plotter 12 which records an image described by the image data onto a recording sheet. The encoding and decoding part 13 encodes the image data which is to be transmitted to a destination facsimile machine when the facsimile machine 1 is a source and decodes the image data which is received from a source facsimile machine when the facsimile machine 1 is a destination. The memory 14 temporarily stores the image data. The modem 15 modulates the image data which is to be transmitted to the interface circuit 2 and demodulates the image data which is received through the interface circuit 2. The modem 15 also transmits various procedure signals of transmission control procedures. The communication control part 16 controls a communication in the ECM and makes a predetermined facsimile communication. The operation and display part 17 has an operation portion for setting various operations of the facsimile machine 1 and a display portion for displaying modes of the facsimile machine 1, guidances for operating the facsimile machine 1 and the like. The system control part 18 is made up of a microcomputer, for example, and controls the scanner 11, the plotter 12, the encoding and decoding part 13, the memory 14, the communication control part 16 and the operation and display part 17 so as to carry out a predetermined operation on the facsimile machine 1.

When the facsimile machine 1 is used as the destination for receiving the image data from the source, an operator confirms by a conversation through the handset 4 that he is ready to receive a document image and then pushes a receive button (not shown) provided on the operation portion of the operation and display part 17. As a result, a facsimile transmission is started in the ECM according to a predetermined transmission control procedure.

In the ECM, the image data is transmitted in frames with the data format of the HDLC frame. In this case, one frame of the image data has a frame structure shown in FIG. 3A. One frame includes a flag sequence F, an address field A, a control field C, a facsimile control field FCF, a facsimile information field FIF, a frame check sequence FCS and a flag sequence F. An information FCD which indicates that the frame relates to the image data is set in the facsimile control field FCF. A frame number NO and a coded image data CD are set in the facsimile information field FIF. In addition, an error correction code CRC is set in the frame check sequence FCS.

Figure 3A:
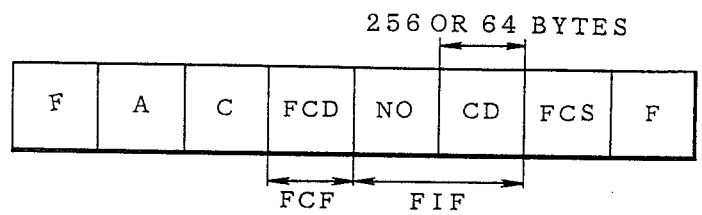
FIGS. 3A and 3B respectively are diagrams for explaining a frame structure of a frame of an image data FIGS. 4A and 4B respectively are flow charts for explaining an operation of a system control part for carrying out a reception process in the first embodiment.

A maximum of 256 frames respectively having the frame structure shown in FIG. 3A are arranged and information frames related to a preamble and a transmission control are added thereto to constitute one block.

Figure 3B:
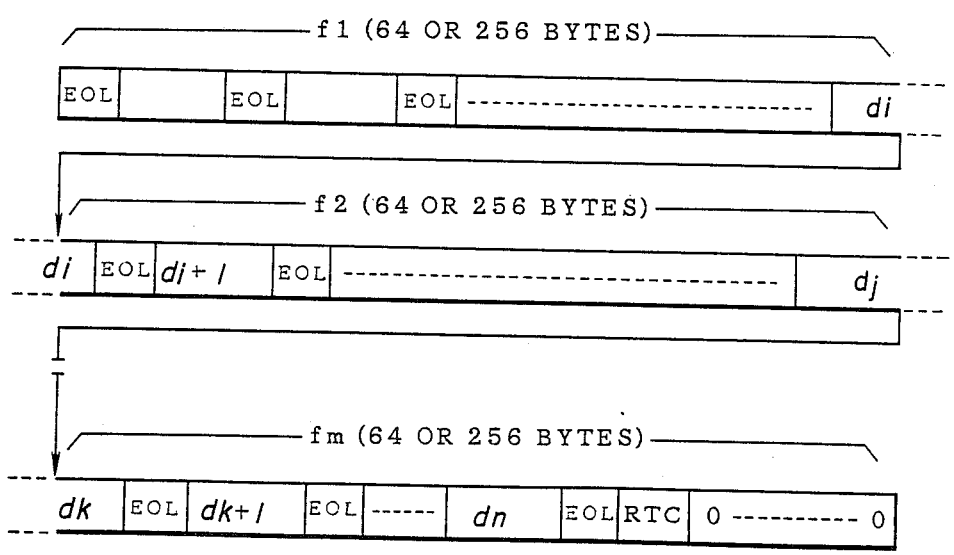

As shown in FIG. 3B, 256 bytes or 64 bytes of coded image data $d_1$ through $d_n$ are set at a time in the image data CD of each of frames $f_1$ through $f_m$ within one block, where the coded image data $d_1$ through $d_n$ are related to each of the lines respectively sectioned by the EOL code. A return to control (RTC) code which indicates the end of the image data is set in the image data CD of the last frame $f_m$, and in addition, dummy data containing all "0"s are added to the RTC code so as to make the number of bits a predetermined value.

Figure 4A:
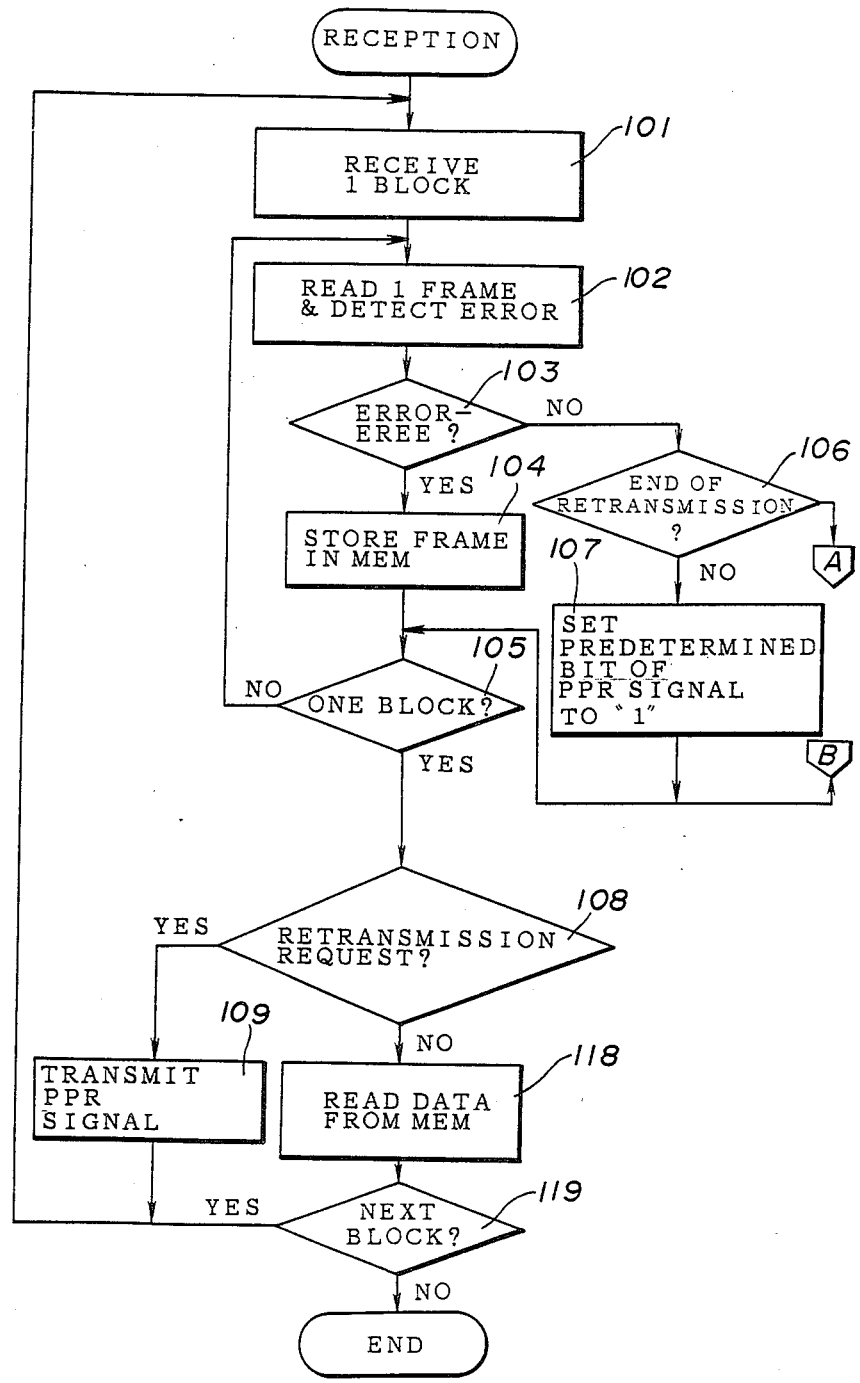
Figure 4B:
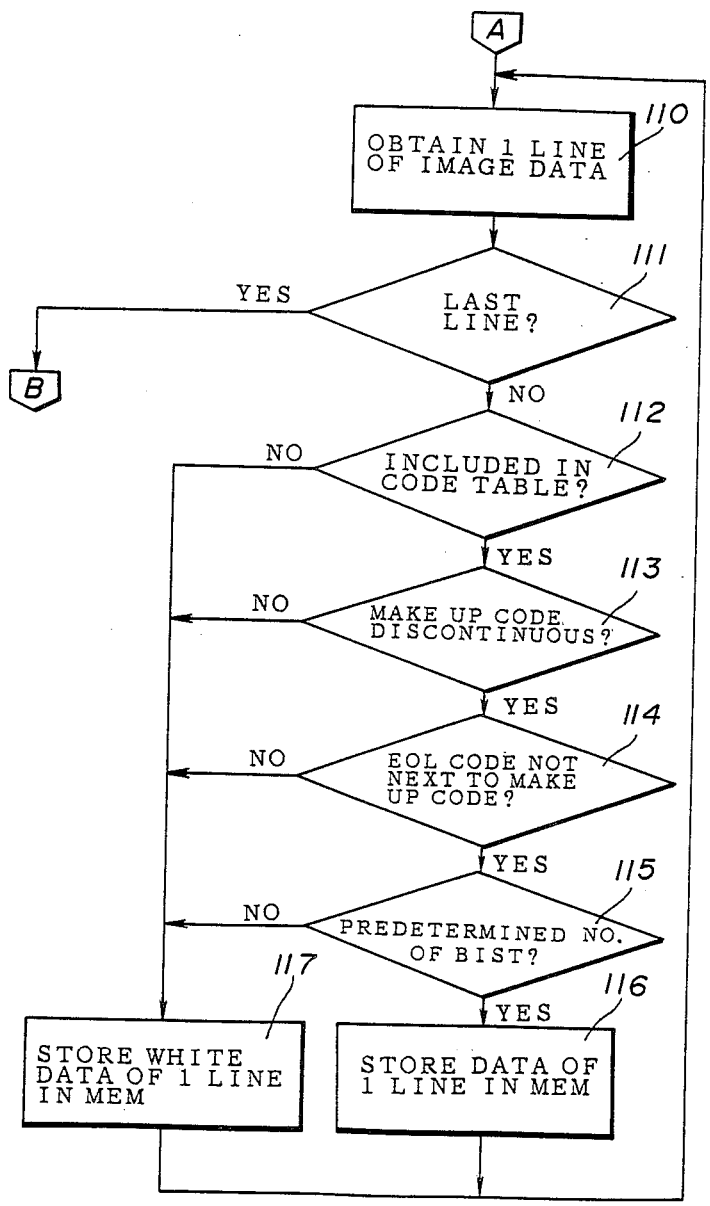

FIGS. 4A and 4B are flow charts for explaining an operation of the system control part 18 for carrying out a reception process in the first embodiment, that is, when the facsimile machine 1 is the destination. In FIG. 4A, a step 101 receives one block of the image data described above and stores the image data in a data buffer (not shown). This data buffer may be a part of the system control par 18, for example. Then, a step 102 reads out one frame of the image data and makes an error detection using the CRC code in the frame. A step 103 discriminates whether or not the one frame is error-free, that is, no data error exists in the one frame. When the discrimination result in the step 103 is YES, a step 104 stores the one frame of the image data into the memory 14 and a step 105 discriminates whether or not the process is completed for all of the frames within the one block. The process returns to the step 102 so as to make an error detection with respect to another frame when the discrimination result in the step 105 is NO.

In this embodiment, it is assumed for convenience' sake that the transmission process of the source is ended when retransmissions are made three times at a minimum data transmission rate of 2400 bps and that the retransmission of a frame is discontinued to make a next predetermined transmission such as transmitting an end signal in conformance with a protocol of the facsimile machine when the transmission is unsuccessful even when the same frame is retransmitted three times. In this case, the source transmits an end of retransmission (EOR) signal and informs the end of the retransmission to the facsimile 1 after transmitting the image data of a last block. The EOR signal is generated in the communication control part 16.

On the other hand, when a data error exists in the one frame and the discrimination result in the step 103 is NO, a step 106 discriminates whether or not the frame is a last frame before the end of the retransmission. When the discrimination result in the step 106 is NO, a step 107 sets a predetermined bit of a frame data of a partial page request (PPR) signal which is transmitted with the retransmission request to "1" and stores an information indicating that the retransmission request of this frame is necessary. The PPR signal is generated in the communication control part 16.

When the above described process is carried out with respect to all of the frames within one block, the discrimination result in the step 105 becomes YES and a retransmission request is made if needed. In other words, a step 108 discriminates whether or not the retransmission request is to be made, and the discrimination result in the step 108 becomes YES when the retransmission is not to be ended and one of the bits of the frame data of the PPR signal is set to "1". In this case, a step 109 transmits a predetermined PPR signal to the source and makes the transmission request.

The source retransmits the image data of the requested frame in one block, and the facsimile machine 1 which is the destination receives and checks each frame of the received block. The correct image data free of data errors are stored in the memory 14. But when a data error again exists in the retransmitted frame, the frame data of the PPR signal is set with respect to this frame containing the data error. Then, after the process is carried out for all of the frames within the block, the retransmission request is made again and the source carries out the retransmission process in response to this retransmission request.

When the retransmission process is carried out and the retransmission of the same frame is made three times, for example, the EOR signal indicating the end of the retransmission is transmitted from the source. In this case, the discrimination result in the step 106 becomes YES and the process advances to a step 110 shown in FIG. 4B. The step 110 obtains one line of the image data from the frame by detecting the EOL code, and a step 111 discriminates whether or not the line is a last line. When the discrimination result in the step 111 is NO, a process is carried out to discriminate whether or not a data error exists in the image data of the line.

In this embodiment, a modified Huffman (MH) coding scheme is employed as the data compression (encoding) system. According to the MH coding scheme, one line of the image data is made up of a termination code, a make up code, the EOL code, a return to control (RTC) code and a dummy data containing all "0"s. When decoding the image data, the termination code and the make up code are subjected to a code conversion by referring to a code table so as to obtain the original image data having a predetermined number of bits.

When a data not included in the code table exists within one line of the image data, when the make up code is continuous, or when the EOL code exists next to the make up code, it may be judged that a data error exists. It may also be judged that a data error exists when the original image data obtained by the decoding does not have the predetermined number of bits.

Next, in this embodiment, the one line of the image data is decoded under the following four conditions so as to detect the data error. Firstly, a step 112 discriminates whether or not there exists an image data included in the code table. When the discrimination result in the step 112 is YES, a step 113 discriminates whether or not the make up code is discontinuous. When the discrimination result in the step 113 is YES, a step 114 discriminates whether or not the EOL code exists not next to the make up code. When the discrimination result in the step 114 is YES, a step 115 discriminates whether or not the original image data obtained by the decoding has the predetermined number of bits. A step 116 stores the image data of the one line into the memory 14 when the discrimination result in the step 115 is YES.

On the other hand, when the discrimination result in any of the steps 112 through 115 is NO, a step 117 stores a white image data amounting to one line in the memory 14 in place of the image data amounting to one line and containing the data error.

Thereafter, the process returns to the step 110 and a similar process is repeated until the image data of each of the lines within the one frame and free of data errors are stored in the memory 14.

In many cases, the image data of the last line is divided between two successive frames and may not amount to one line in one frame. For this reason, measures are taken so that the above described process is not carried out with respect to the last line. In other words, when the discrimination result in the step 111 is YES in FIG. 4B, the process advances to the step 105 shown in FIG. 4A so as to discriminate whether or not the process is completed for all of the frames within the one block. When the discrimination result in the step 105 is NO, the process returns to the step 102 and the process described before is repeated.

When the process with respect to the one block is completed and the discrimination result in the step 105 becomes YES and the discrimination result in the step 108 becomes NO, a step 118 shown in FIG. 4A successively reads out the image data stored in the memory 14, decodes the read out image data and records the image on the plotter 12. A step 119 discriminates whether or not a next block is received after the recording of the image on the plotter 12. The process advances to the step 101 to receive this next block when the discrimination result in the step 119 is YES. But the process is ended when there is no next block and the discrimination result in the step 119 is NO. In other words, the reception process is ended when the last block is received.

Figure 1A:
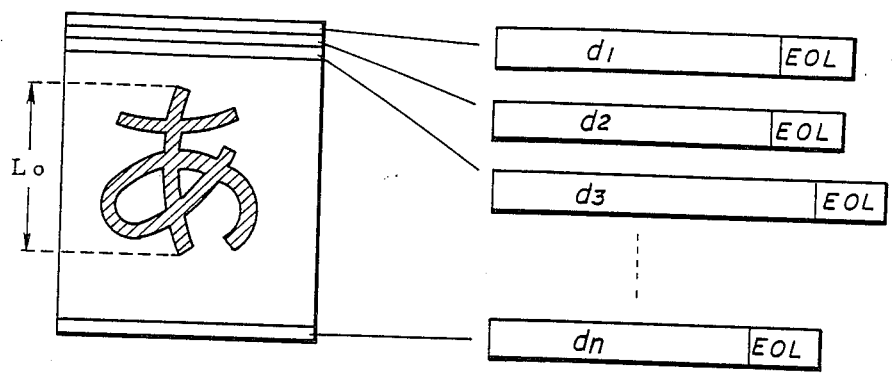
FIG. 1A is a diagram for explaining a document image and an image data thereof.
Figure 5:
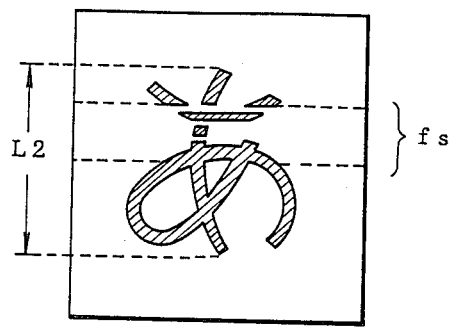
FIG. 5 shows an image recorded on the first embodiment when a frame contains a data error.

Suppose that the image shown in FIG. 1A described before is transmitted from the source and the correct image data is not received by the facsimile machine 1 even when the retransmission of the specific frame $f_s$ is made three times. In this case, the image data of the lines which are within the frame $f_s$ and contain no data error are recorded as shown in FIG. 5 in this embodiment. As a result, it is possible to record to a certain extent the image of the frame $f_s$ containing the data error.

Figure 1B:
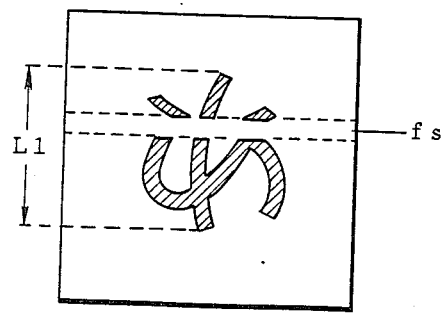
FIGS. 1B and 1C respectively show an image recorded on a conventional facsimile machine for explaining the problems thereof.
Figure 1C:
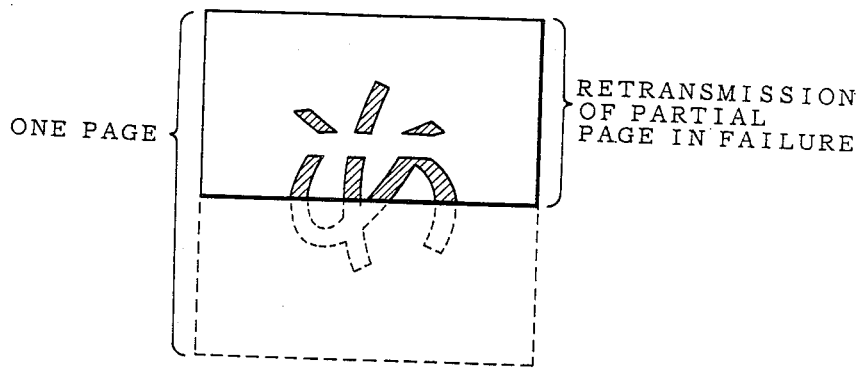

According to this embodiment, when a data error is detected within one frame which is received during the last retransmission process, the existence of the data error is checked for each of the lines within the frame. Those lines having no data error are recorded. Therefore, a dropout of the image due to the data error is considerably reduced compared to the image recorded on the conventional facsimile machine as may be seen by comparing FIGS. 5 and 1B. In addition, it may be seen from these figures that a reduction in the length of the recorded image due to the data error is considerably reduced compared to the image recorded on the conventional facsimile machine.

Next, a description will be given of a second embodiment of the facsimile machine according to the present invention. In the first embodiment, 256 bytes or 64 bytes of the image data to be transmitted are set in one HDLC frame as recommended by the CCITT. However, in this second embodiment, 32 bytes of the image data to be transmitted are set in one HDLC frame. The block system shown in FIG. 2 can also be employed in this second embodiment.

Figure 6:
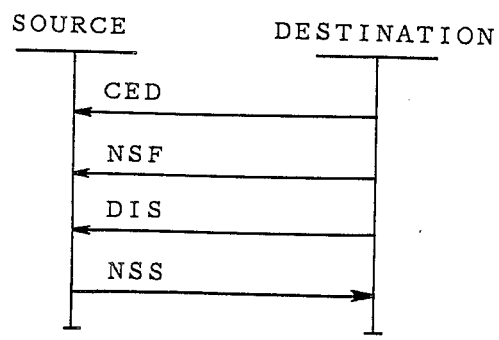
FIG. 6 is a diagram for explaining procedure signals transmitted at a start of a communication for explaining a second embodiment of the facsimile machine according to the present invention.

As shown in FIG. 6, the facsimile machine 1 which is the destination transmits a called station identification (CED) signal, a non-standard facilities (NSF) signal and a digital identification signal (DIS) at a start of a communication. The CED signal informs the source that the destination is ready to receive the transmission, and the NSF and DIS signals inform the functions of the destination to the source. The CED, NSF and DIS signals are generated in the communication control part 16. When transmitting these signals CED, NSF and DIS, the destination informs the functions thereof to the source by the NSF signal such as a function of receiving the image data 32 bytes at a time. On the other hand, the source discriminates the functions of the destination based on the signal NSF, and transmits a non-standard facilities set-up signal (NSS) which informs the destination the conditions under which the transmission will be made. In this embodiment, the NSS informs the destination that a data quantity of the image data is 32 bytes per frame. The NSS signal is generated in the communication control part 16.

Figure 7:
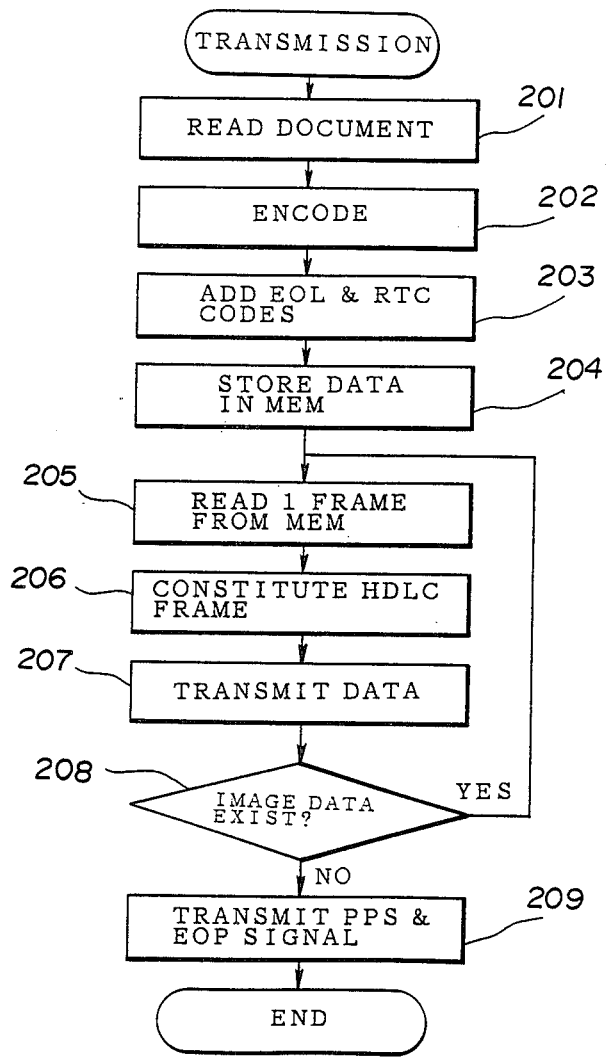
FIG. 7 is a flow cart for explaining an operation of the system control part for carrying out a transmission process in the second embodiment.

FIG. 7 is a flow chart for explaining an operation of the system control part 18 shown in FIG. 2 for carrying out a transmission process in the second embodiment, that is, when the facsimile machine 1 is the source. After a predetermined transmission control procedure, a step 201 shown in FIG. 7 reads each line of the document image which is to be transmitted, and a step 202 successively encodes the image data of the lines. Then, a step 203 adds the EOL code and the RTC code to the (coded) image data of each line, and a step 204 temporarily stores the (coded) image data in the memory 14.

Figure 8:
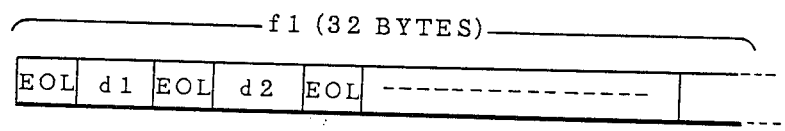
FIG. 8 is a diagram showing an erroneous frame which is received during a retransmission process.

A step 205 reads out from the memory 14 the image data amounting to one frame, that is, 32 bytes as shown in FIG. 8 and a step 206 constitutes by the read out image data predetermined frames with the data format of the HDLC frame. A step 207 transmits from the modem 15 the image data in frames with the data format of the HDLC frame. Next, a step 208 discriminates whether or not other image data exist. The process returns to the step 205 when the discrimination result in the step 208 is YES. On the other hand, when only one block of image data is to be transmitted and the discrimination result in the step 208 is NO, a step 209 transmits a partial page signal (PPS) and an end of procedure (EOP) signal to inform the destination of the end of the image data, that is, the transmission of the last page is completed. The EOP signal is generated in the communication control part 16.

Figure 9:
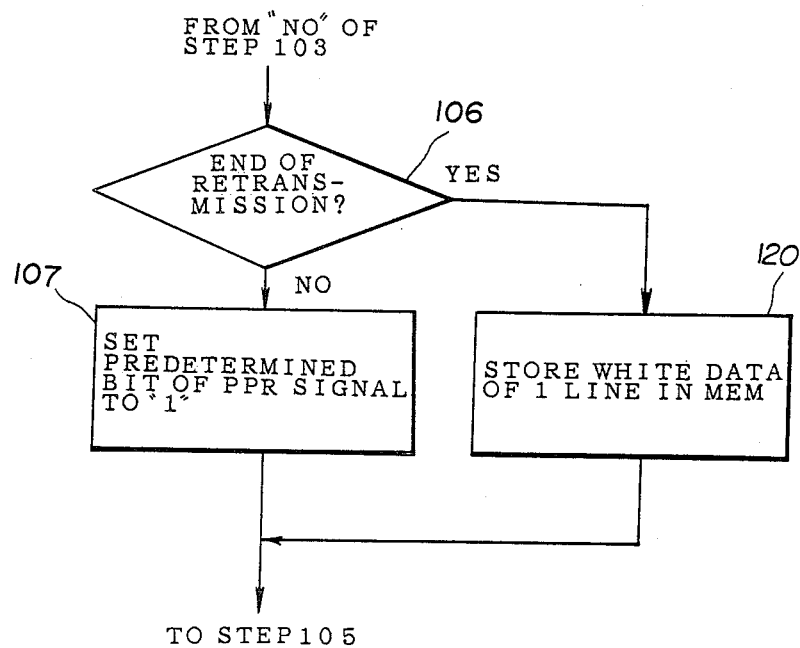
FIG. 9 is a flow chart for explaining an operation of the system control part for carrying out a reception process in the second embodiment.

FIG. 9 is a flow chart for explaining an operation of the system control part 18 shown in FIG. 2 for carrying out a reception process in the second embodiment, that is, when the facsimile machine 1 is the destination. In FIG. 9, those steps which are substantially the same as those corresponding steps in FIGS. 4A and 4B ar designated by the same reference numerals, and the illustration of steps identical to those shown in FIG. 4A will be omitted.

In FIG. 9, the step 106 is carried out when the discrimination result in the step 106 shown in FIG. 4A is NO. When the discrimination result in the step 106 is YES, a step 120 stores a white image data amounting to one line in the memory 14 in place of the image data amounting to one line and containing the data error and the process advances to the step 105 shown in FIG. 4A. The rest of the process is identical to that described before in conjunction with FIG. 4A.

Accordingly, when a transmission error occurs and a data error is detected in the received image data, the PPR signal is transmitted to request a retransmission of the image data of the frame in which the data error is detected.

Figure 10:
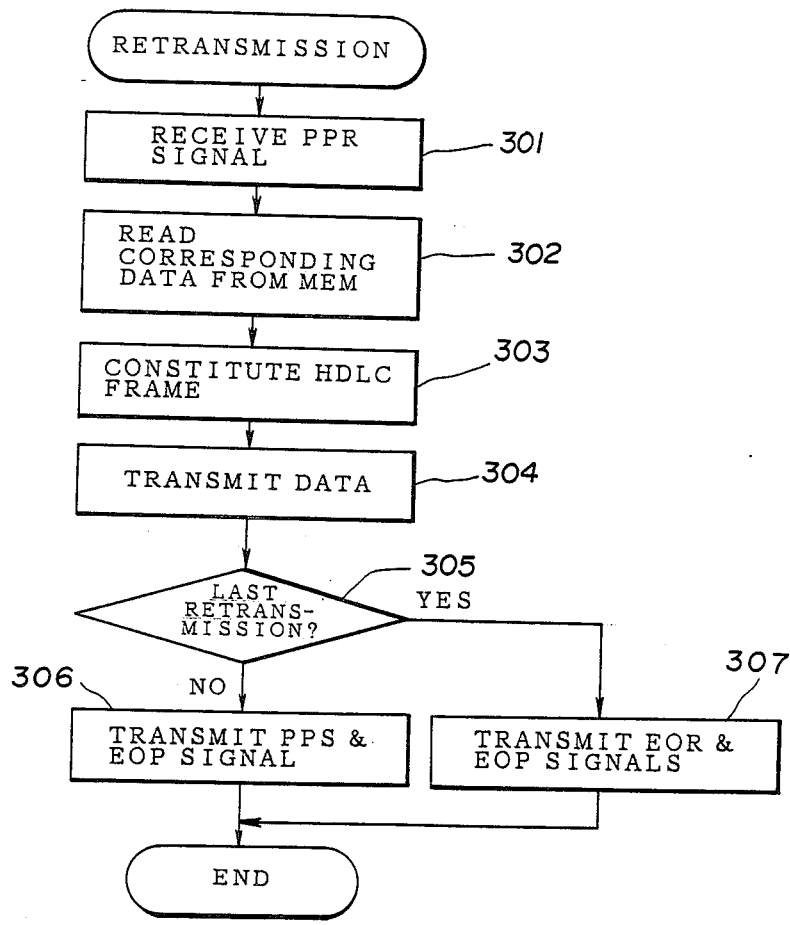
FIG. 10 is a flow chart for explaining an operation of the system control part for carrying out a retransmission process in the second embodiment.

FIG. 10 is a flow chart for explaining an operation of the system control part 18 shown in FIG. 2 for carrying out a retransmission process in the second embodiment, that is, when the facsimile machine 1 is the source. In FIG. 10, a step 301 receives the PPR signal from the destination, and a step 302 reads out from the memory 14 the corresponding image data of the frame which is requested from the destination to be retransmitted. Similarly to the process described before, a step 303 constitutes by the read out image data predetermined frames with the data format of the HDLC frame, and a step 304 transmits from the modem 15 the image data in frames with the data format of the HDLC frame.

In this embodiment, the retransmission process is ended after the retransmission is made a predetermined number of times under a predetermined condition. Hence, a step 305 discriminates the condition, that is, whether or not it is a last retransmission process. When the discrimination result in the step 305 is NO, a process 306 transmits the PPS and the EOP signal to indicate the end of the image data.

On the other hand, when a plurality of transmission errors occur and the retransmission process is repeated, the discrimination result in the step 305 becomes YES. In this case, a step 307 transmits the EOR signal and the EOP signal to inform the end of the retransmission to the destination.

The destination receives the last image data and a data error exists therein, the discrimination result in the step 103 shown in FIG. 4A is NO and the discrimination result in the step 106 shown in FIG. 9 is YES. In this case, the step 120 shown in FIG. 9 stores the white image data amounting to one line in the memory 14 in place of the image data amounting to one line and containing the data error and the process advances to the step 105 shown in FIG. 4A.

When the processing is carried out for all of the frames within the one block and the discrimination result in the step 105 shown in FIG. 4A becomes YES, the discrimination result in the step 108 is NO because no retransmission request can be made. Hence, the step 118 successively reads out the image data stored in the memory 14 and records the received image on the recording sheet.

Figure 11:
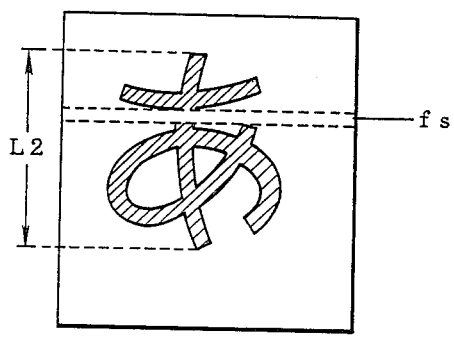
FIG. 11 shows an image recorded on the second embodiment when the erroneous frame exists.

For example, when a data error is detected in a specific frame $f_s$ during the last retransmission process, the image of this frame $f_s$ drops out as shown in FIG. 11.

When a transmission error exists in even one bit of the data within one frame, the entire frame is conventionally not recorded because it is regarded as an erroneous frame. However, in this embodiment, the image data transmitted in one frame is 32 bytes which is small compared to the 64 bytes or 256 bytes employed conventionally. Accordingly, when only a slight bit error exists, an image portion corresponding to the erroneous frame $f_s$ is extremely small compared to the entire document image. For this reason, the image portion which drops out due to the bit error is extremely small and a length $L_2$ of the recorded image is only slightly shorter than the length $L_0$ of the original document image.

Figure 12:
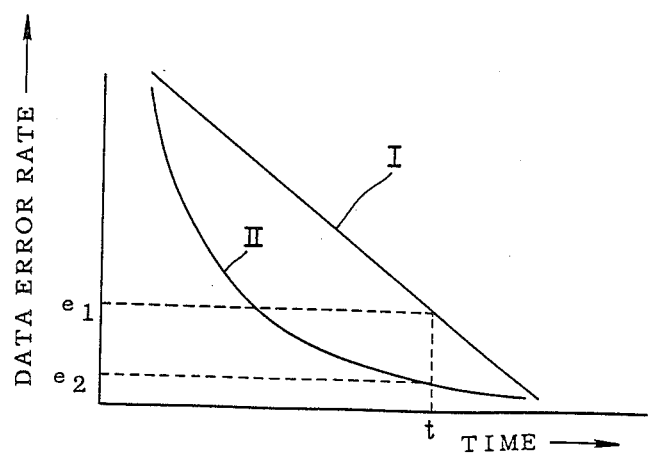
FIG. 12 is a graph showing a communication time versus a data error rate characteristic of the second embodiment.

The present inventor has conducted experiments by making an image transmission in the ECM in a state where a transmission error is likely to occur on the line. By such experiments, a communication time and a reduction in a data error rate observed when the retransmission process is carried out were measured. FIG. 12 shows results of the experiments, where the abscissa indicates the communication time and the ordinate indicates the data error rate. It may be seen from FIG. 12 that the data error rate gradually decreases with time after the start of the communication due to the retransmission process as indicated by a characteristic I when the image data quantity per frame is a large value such as 256 bytes. On the other hand, when the image data quantity is a small value such as 32 bytes, the data error rate rapidly decreases after the start of the communication but it takes time until the data error rate becomes zero as indicated by a characteristic II.

Normally, the retransmission is ended under a predetermined condition. Thus, when the retransmission process is ended at a time t in FIG. 12, for example, the data error rate is e1 when the image data quantity per frame is 256 bytes and is e2 when the image data quantity per frame is 32 bytes, for example. Therefore, when the image data quantity per frame is set to a small value as is the case of this embodiment, it is possible to make the data error rate small compared to the conventional case when the retransmission process is ended.

Next, a description will be given of a third embodiment of the facsimile machine according to the present invention. The block system shown in FIG. 2 can also be employed in this third embodiment. In this embodiment, image data amounting to one line is set per frame. In addition, at the start of the communication, the facsimile 1 which is the destination outputs the NSF signal to inform the functions thereof to the source, while the facsimile 1 which is the source discriminates the functions of the destination and outputs the NSS signal to inform the communication mode to the destination.

The facsimile machine 1 which is the source transmits the image data by the process similar to that described before in conjunction with FIG. 7. But in this case, the memory 14 stores the EOL code, the image data $d_1$ through $d_n$ and the RTC code as shown in FIG. 13A. When storing the EOL code, the image data $d_1$ through dn and the RTC code in the memory 14, addresses $A_1$ through An of the memory 14 where the image data $d_1$ through dn are stored are set to correspond to the frame number as shown in FIG. 13B. Furthermore, the image data of the frames $f_1$ through $f_n$ are respectively constituted by the encoded image data amounting to one line and the EOL code and the RTC code is regarded as a frame $f_{n+1}$ *having a frame number n+1 as shown in FIG. 13C.*

The facsimile machine 1 which is the source transmits the above described image data in frames with the data format of the HDLC frame.

FIG. 14 is a flow chart for explaining an operation of the system control part 18 shown in FIG. 2 for carrying out a reception process in the third embodiment, that is, when the facsimile machine 1 is the destination. In FIG. 14, those steps which are substantially the same as those corresponding steps in FIGS. 4A and 4B are designated by the same reference numerals, and the illustration of steps identical to those shown in FIG. 4A will be omitted.

In FIG. 14, the step 103 is carried out after the step 102 shown in FIG. 4A. When the discrimination result in the step 103 is YES, a step 121 decodes the image data of the received one frame and the step 104 stores the decoded image data into the memory 14. When the image data amounting to one line is decoded, the decoded image data has a fixed data quantity such as 1728 bits in the case where the document image is size A4, for example, and the data administration after storage in the memory 14 is facilitated.

On the other hand, when the discrimination result in the step 103 is NO and the discrimination result in the step 106 is YES, the step 120 stores the white image data amounting to one line in the memory 14 in place of the image data amounting to one line and containing the data error and the process advances to the step 105 shown in FIG. 4A. The rest of the process is identical to that described before in conjunction with FIG. 4A.

Accordingly, when a transmission error occurs and a data error is detected in the received image data, the PPR signal is transmitted to request a retransmission of the image data of the frame in which the data error is detected. In addition, the retransmission process is ended under a predetermined condition.

In this embodiment, only one line of the received image drops out when a data error occurs in one frame. Hence, an image portion corresponding to the erroneous frame is extremely small compared to the entire document image, and a length of the recorded image is only slightly shorter than the length of the original document image. Further, because the image data quantity per frame is small, the data error rate drops within a short time making it advantageous when ending the retransmission process during an intermediate stage.

Next, a description will be given of a fourth embodiment of the facsimile machine according to the present invention. The block system shown in FIG. 2 can also be employed in this fourth embodiment. In this embodiment, the operation of the system control part 18 when the facsimile machine 1 is the source is the same as that of the first embodiment described before.

Figure 15:
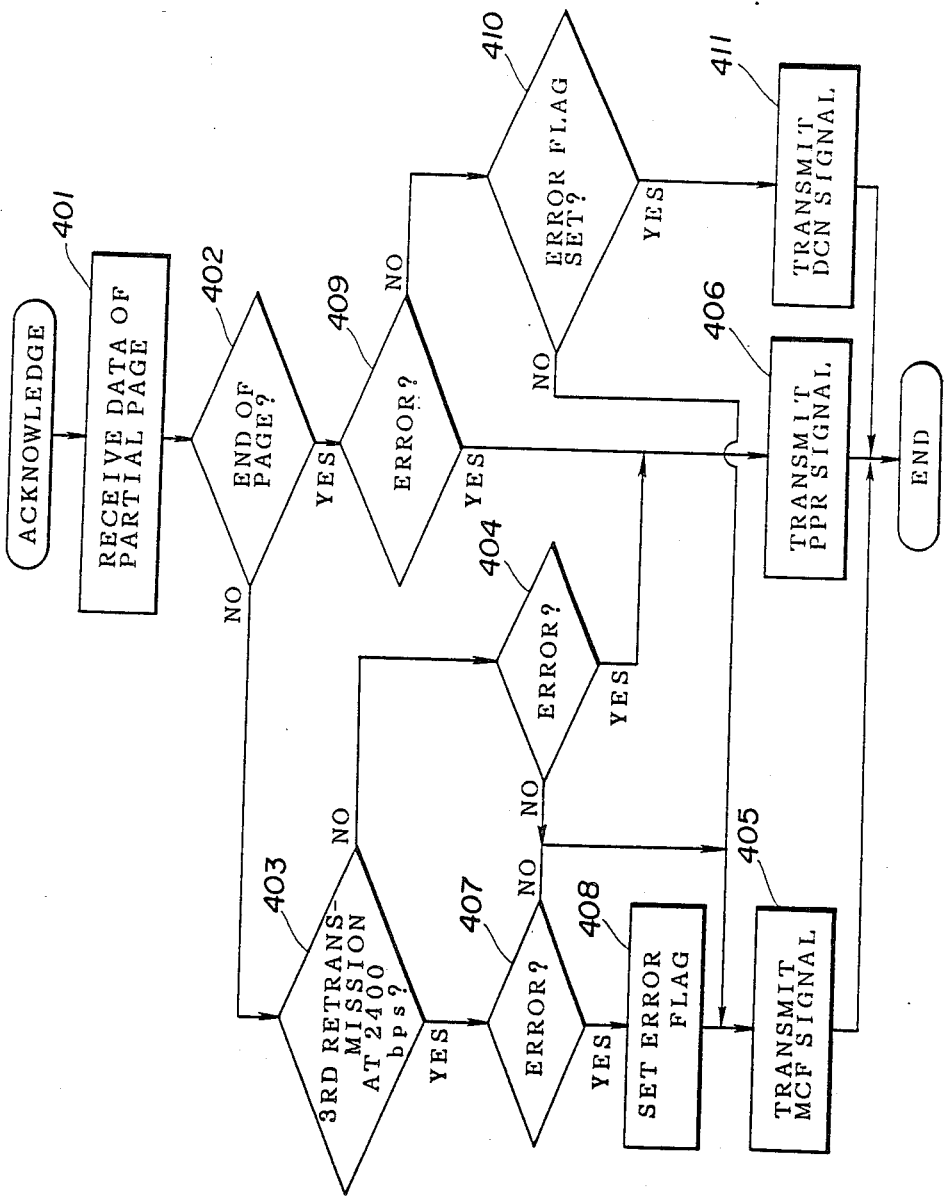
FIG. 15 is a flow chart for explaining an operation of the system control part for carrying out an acknowledge process in a fourth embodiment of the facsimile machine according to the present invention.

FIG. 15 is a flow chart for explaining an operation of the system control part 18 shown in FIG. 2 for carrying out an acknowledge process in a fourth embodiment of the facsimile machine according to the present invention when the facsimile machine 1 is the destination. The acknowledge process is carried out with respect to the source when the destination receives the image data amounting to one block.

In FIG. 15, a step 401 receives the image data of one partial page and a step 402 discriminates whether or not an end of one page is reached by detecting whether the next procedure signals are the PPS and a NULL signal or the PPS and the EOP signal. The signal NULL is generated in the communication control part 16. When the discrimination result in the step 402 is NO, a step 403 discriminates whether or not the retransmission at the data transmission rate of 2400 bps is the third retransmission, that is, whether or not the retransmission is the last retransmission. When the discrimination result in the step 403 is NO, a step 404 discriminates whether or not a transmission error exists. A step 405 transmits a message confirmation (MCF) signal to inform the source that a normal reception is made when the discrimination result in the step 404 is NO. The MCF signal is generated in the communication control part 16. On the other hand, a step 406 transmits a predetermined PPR signal to request a retransmission to the source when the discrimination result in the step 404 is YES.

When the discrimination result in the step 403 is YES, a step 407 discriminates whether or not a transmission error exists. The process advances to the step 405 when the discrimination result in the step 407 is NO. On the other hand, when the discrimination result in the step 407 is YES, a step 408 sets (turns ON) an error flag to indicate that an error exists in the partial page. The step 405 is carried out after the step 407 to prevent the source from discontinuing the communication.

When the end of one page is detected and the discrimination result in the step 402 becomes YES, a step 409 discriminates whether or not a transmission error exists. When the discrimination result in the step 409 is YES, the step 406 transmits the PPR signal as is done in the normal case. But when the discrimination result in the step 109 is NO, a step 410 discriminates whether or not the error flag is set (ON). The step 405 transmits the MCF signal when the discrimination result in the step 410 is NO. On the other hand, when the discrimination result in the step 410 is YES, a step 411 transmits a disconnect (DCN) signal to inform the source that the line is to be disconnected and the connection will be switched from the facsimile machine 1 to the handset 4. This DCN signal is generated in the communication control part 16.

Figures 16A, 16B, 16C:
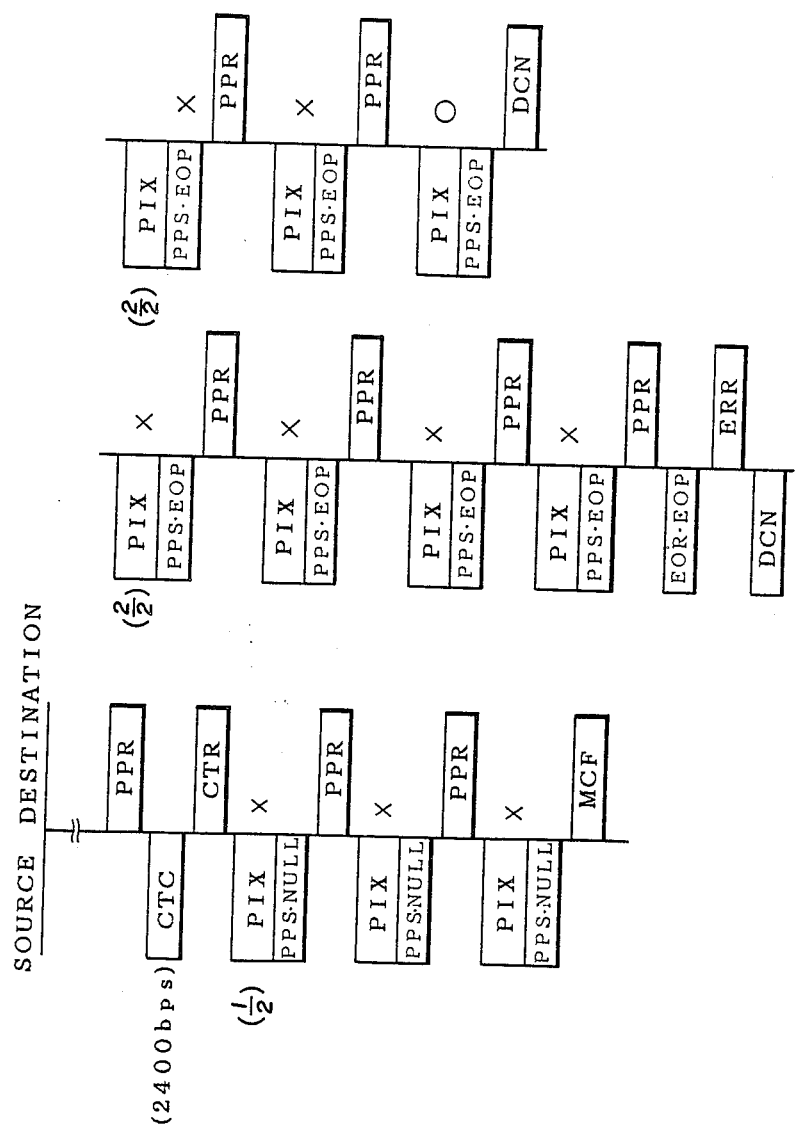
FIGS. 16A through 16C respectively are diagrams for explaining a transmission procedure of the fourth embodiment.

FIGS. 16A through 16C respectively are diagrams for explaining a transmission procedure of the fourth embodiment. FIG. 16A shows a state where a large number of transmission errors occur during the transmission of an image data PIX which is related to a first half (½) of one document page which is to be transmitted. As shown, the data transmission rate is shifted down to 2400 bps according to the shift down procedure of a continue to correct (CTC) signal and a response for continue to correct (CTR) signal, but the transmission error occurs in the partial page during each of the three retransmissions. The CTC signal informs the destination that the retransmission will be continued and also a modem rate, while the CTR signal informs the source that the destination can accept the content included in the CTC signal. The CTC and CTR signals are generated in the communication control part 16. In this case, the MCF signal is transmitted after the reception of the retransmitted image data PIX which is received for the third time, and the source next transmits an image data PIX related to the latter half (2/2) of the one document page.

FIG. 16B shows a state after the state shown in FIG. 16A for a case where the transmission error occurs in each of the first transmission and three successive retransmissions made thereafter of the image data PIX related to the latter half (2/2) of the one document page. On the other hand, FIG. 16C shows a state after the state shown in FIG. 16A for a case where the image data PIX related to the latter half (2/2) of the one document page is normally received by the first retransmission, and the DCN signal is transmitted in this case.

Therefore, in this embodiment, the MCF signal is transmitted when the transmission error occurs during the last retransmission of the partial page so that the communication will be continued. For this reason, it is always possible to receive the image data amounting to one document page and there is no dropout of an image portion in the image which is recorded in the destination.

On the other hand, when a data error occurs in the partial page, the DCN signal is transmitted even when the partial page is normally received by the last reception. It is thus possible to prevent the source from erroneously discriminating a normal reception by the destination when an incomplete image is received by the destination.

In this embodiment, the reception error is reported to the source by the DCN signal. However, even when no data error exists, it is of course possible to transmit the PPR signal and repeatedly request the retransmission until the transmission is discontinued. In this case, the retransmission request will be accepted by the source when measures are taken so that the PPR signal requests the retransmission of the first frame.

In the embodiments described heretofore, the image data quantity per frame is set to 256 bytes, 64 bytes, 32 bytes or one line. However, the image data quantity per frame is not limited to such and the image data quantity may be set to any arbitrary number of bits or lines. In addition, the image data is transmitted in the ECM, but the present invention is also similarly applicable to cases where the error detection is made in units of image data amounting to a predetermined number of lines. Furthermore, the facsimile machine of the present invention is not limited to use with the mobile telephone set, and the facsimile machine is of course similarly applicable to the ordinary telephone set, the radio telephone set and the like. For example, a facsimile communication is recently made by use of the MCA radio apparatus, but the data communication by the MCA radio communication is limited to one minute. Accordingly, in this case, the image data quantity per frame should be set to a small value, and it is extremely effective to reduce the data error rate within a short time as described before in conjunction with FIG. 12.

Next, a description will be given of a fifth embodiment of the facsimile machine according to the present invention. FIG. 17 shows the fifth embodiment of the facsimile machine according to the present invention, and in FIG. 17, those parts which are substantially the same as those corresponding parts in FIG. 2 are designated by the same reference numerals, and a description thereof will be omitted. This fifth embodiment differs from the first embodiment shown in FIG. 2 in that a main memory 21 and a sub memory 22 are provided in place of the memory 14.

The main memory 21 temporarily stores the one block of the image data which is transmitted and received, similarly to the memory 14. When the destination receives a retransmitted frame, the sub memory 22 stores the image data of the same frame which is received previously.

A description will now be given of the image reception operation of this embodiment. When a facsimile machine 1A is used as the destination for receiving the image data from the source, an operator confirms by a conversation through the handset 4 that he is ready to receive a document image and then pushes the receive button (not shown) provided on the operation portion of the operation and display part 17. As a result, a facsimile transmission is started in the ECM according to a predetermined transmission control procedure.

Figure 18:
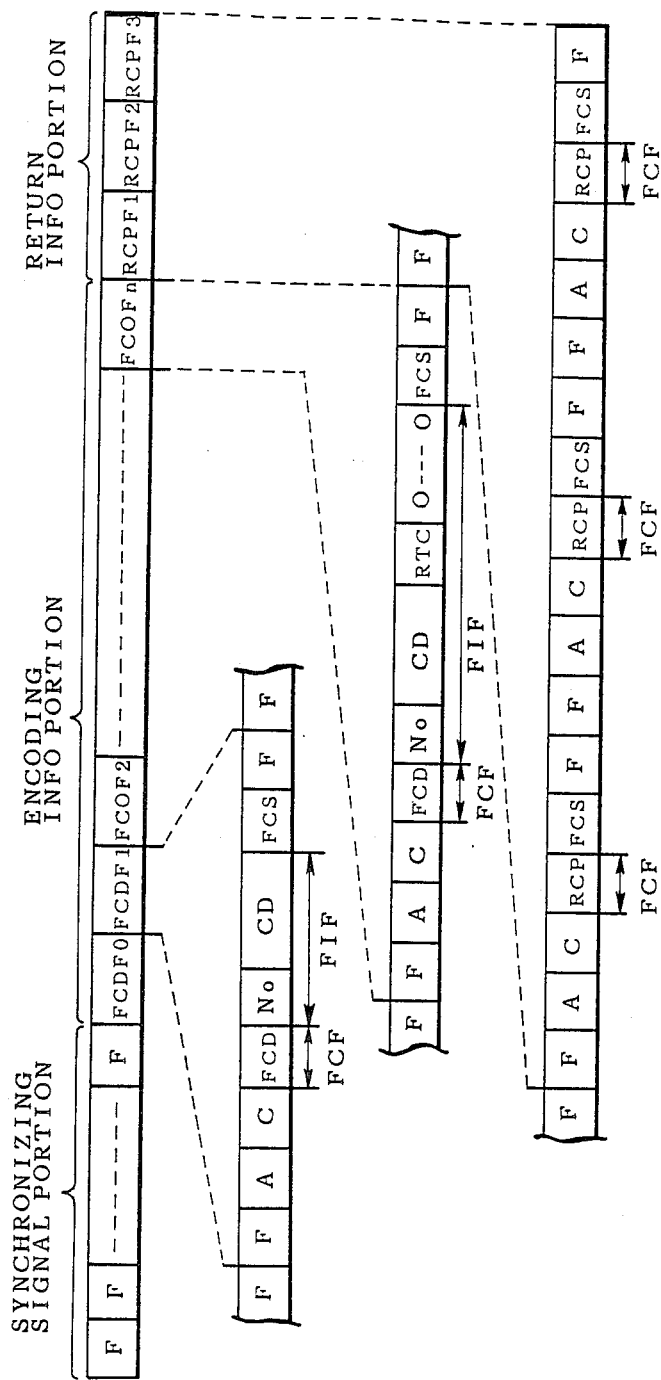
FIG. 18 is a diagram for explaining a frame structure of a frame of an image data transmitted and received in the fifth embodiment.

In the ECM, the image data is transmitted in frames with the data format of the HDLC frame. In this case, one frame of the image data has a frame structure shown in FIG. 3A described before as in the case of the first through fourth embodiments. As shown in FIG. 18, one frame is made up of a synchronizing signal portion having a plurality of flag sequences F arranged therein, an encoding information portion in which the image data are set, and a return information portion indicating an end of the image data and a return to the transmission control procedure. The encoding information portion is made up of a maximum of 256 frames FCDF0 through FCDFn, and the return information portion is made up of a maximum of 3 frames RCP1 through RCP3.

The frames FCDFi and RCPi respectively have the data format of the HDLC frame, where i=0, 1, ..., n. The frame FCDFi includes a flag sequence F, an address field A, a control field C, a facsimile control field FCF, a facsimile information field FIF, a frame check sequence FCS and a flag sequence F.

One byte of data exists in each field except the facsimile information field FIF and the facsimile control field FCF. The flag sequence F is used for discriminating the start and the end of the frame and includes the data "0111 1110". In the facsimile communication, there is no need to designate an address. Thus, when the facsimile machine 1A uses the ordinary telephone line, data containing all "0"s is set in the address field A.

The control field C indicates the last frame in the encoding information portion and the return information portion. The control field C is "1100 1000" in the last frame and is "1100 0000" in other frames.

The facsimile control field FCF indicates the kind of the frame. An information "FCD" which indicates that the frame relates to the image data is set in the facsimile control field FCF in the encoding information portion. On the other hand, an information "RCP (return to control for partial page)" which indicates the end of the image data of the transmitted partial page is set in the facsimile control field FCF in the return information portion.

The facsimile information field FIF is only provided in the frame of the encoding information portion. A frame number No from "0" to "256" and a coded image data CD having a predetermined number of bits such as 256 bits or 64 bits are set in the facsimile information field FIF. In the case of the last frame FCDFn, the RTC code and a dummy data containing all "0"s for making the number of bits a predetermined value are set after the coded image data CD.

In addition, an error correction code CRC for detecting a transmission error in each of the data within the frame is set in the frame check sequence FCS.

The facsimile machine 1A receives the image data transmitted from the source with the format described above and carries out a predetermined reception process. This reception process includes a data reception process for obtaining the image data from the received data and storing the image data, and an decoding and recording process for decoding the stored image data and recording a corresponding image on the recording sheet.

Figure 19A:
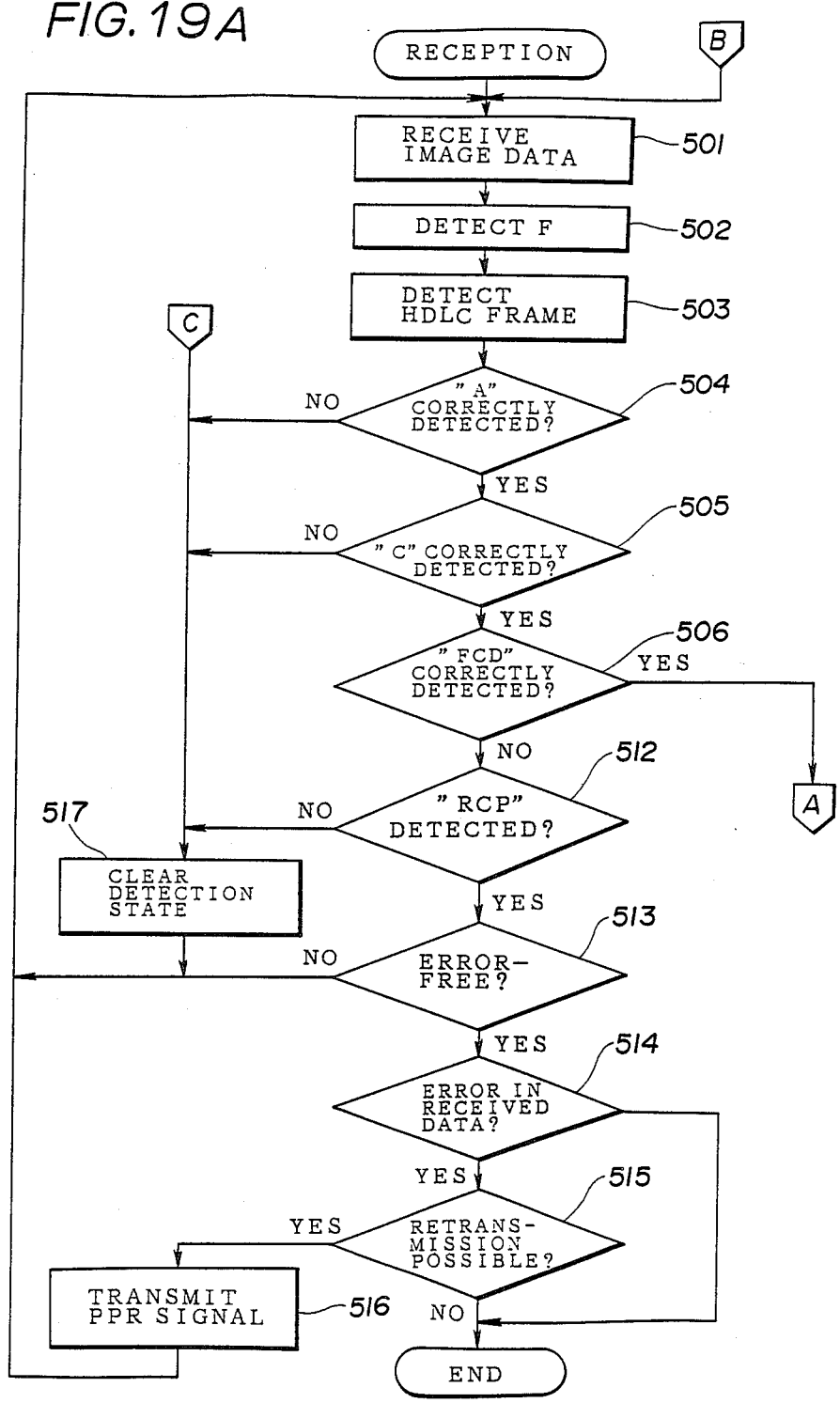
FIGS. 19A and 19B respectively are flow charts for explaining an operation of the system control part for carrying out a reception process in the fifth embodiment.
Figure 19B:
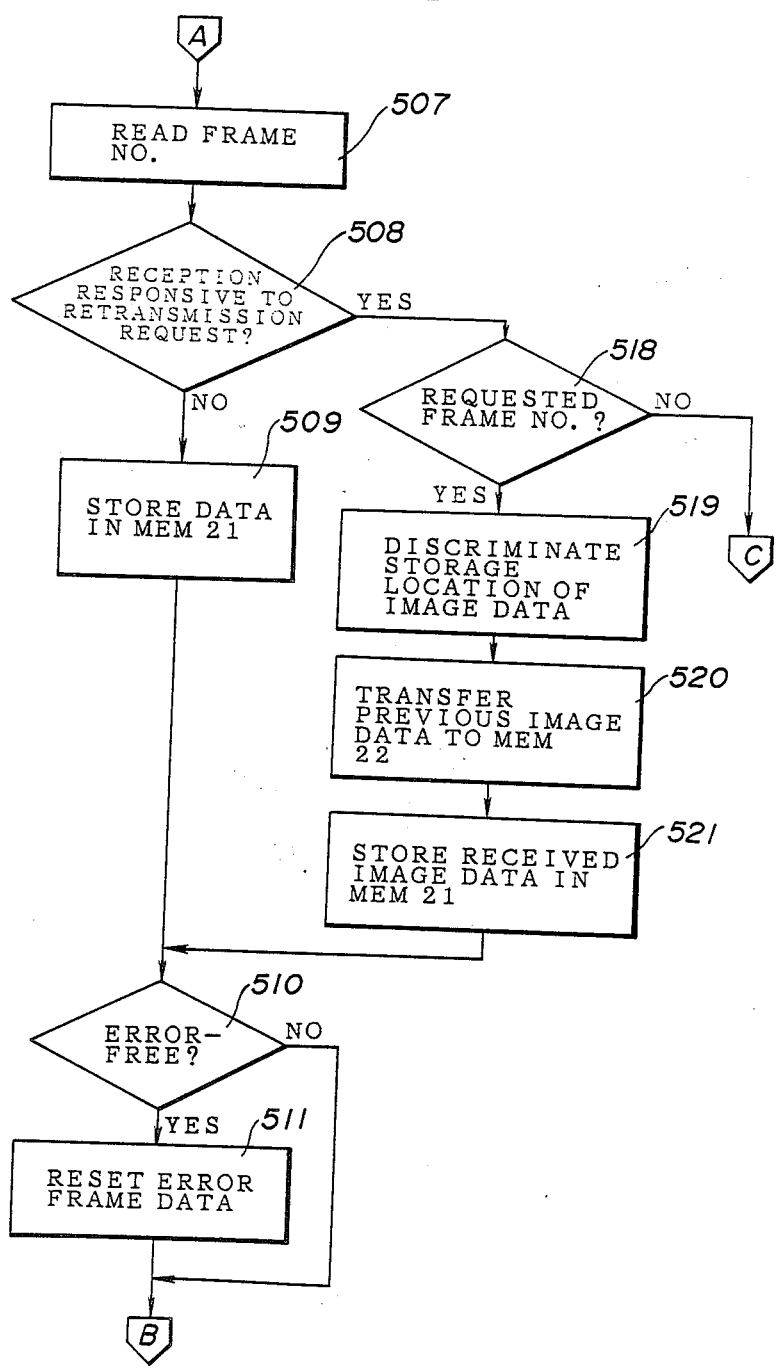

FIGS. 19A and 19B show flow charts for explaining an operation of the system control part 18 for carrying out a reception process in the fifth embodiment when the facsimile machine 1A is the destination. In FIG. 19A, a step 501 receives the image data transmitted from the source and successively stores the image data in a data buffer (not shown). A step 502 detects the flag sequence F of the preamble for synchronization, and a step 503 detects the HDLC frame which follows the preamble.

Steps 504, 505 and 506 respectively discriminate whether or not the address field A, the control field C and the information "FCD" of the facsimile information field FIF are correctly detected for each frame FCDFi out of the frames FCDF0 through FCDFn, where i=0, 1, ..., n. When the discrimination results in the steps 504, 505 and 506 are all YES, a step 507 shown in FIG. 19B reads the frame number NO.

A step 508 discriminates whether or not the present reception is made in response to a retransmission request. During the first reception, that is, when the present reception is not a reception responsive to a retransmission request, the discrimination result in the step 508 is NO. In this case, a step 509 obtains the coded image data CD of each frame and successively stores the image data in the main memory 21.

When making such a data reception, the result of the reception of the image data of each frame within the one block are stored as an error frame data having 256 bits in correspondence with the frame. When starting the reception process, all of the bits of the error frame data having the 256 bits are set to a value indicating "error".

Hence, a step 510 discriminates whether or not each frame is free of transmission errors by checking the CRC code of the frame check sequence FCS. When no transmission error exists and the discrimination result in the step 510 is YES, a step 511 resets the corresponding bits of the error frame data, and the process returns to the step 501 shown in FIG. 19A to repeat a similar process with respect to the next frame. On the other hand, when the discrimination result in the step 510 is NO, the process returns to the step 501.

When the reception of the encoding information portion ends, the return information portion is received. In this case, no information "FCD" is detected in the facsimile information field FIF and the information "RCP" is detected instead. A step 512 shown in FIG. 19A discriminates whether or no the information "RCP" is detected when the discrimination result in the step 506 is NO. When the discrimination result in the step 512 is YES, a step 513 discriminates whether or not the data in each of the frames RCP1 through RCP3 are free of transmission errors by use of the CRC code.

A step 514 discriminates whether or not a transmission error exists in the received data based on the error frame data when the discrimination result in the step 513 is YES. When the transmission error exists and the discrimination result in the step 514 is YES, a step 515 discriminates whether or not a retransmission is possible. The retransmission is not possible when a number of retransmissions of the same data exceeds a predetermined value. When the discrimination result in the step 515 is YES, a step 516 transmits the PPR signal to the source and requests the retransmission of the frame containing the transmission error. After the step 516, the process returns to the step 501. The process is ended when the discrimination result in the step 514 or 515 is NO.

On the other hand, when the discrimination result in the step 504, 505 or 512 is NO with respect to the frame FCDFi, a step 517 clears the detection state up to that time and the process returns to the step 501. The process also returns to the step 501 when the discrimination result in the step 513 is NO. When various errors exist and the last frame of the block cannot be detected correctly, the reception state may be maintained at the step 501. Hence, in this case, a routine of a timer (not shown) is used to move to the step 514 when no data is received for a predetermined time. Such a timer may be an internal timer of the system control part 18.

Therefore, when the address field A and the control field C are not detected, the corresponding bits of the error frame data remain set to the value indicating "error". In addition, when no information "RCP" is detected or even when an error is detected in the frames RCP1 through RCP3, the image data is regarded valid if the image data of the block is normally received without errors up to that time.

Figure 20A:
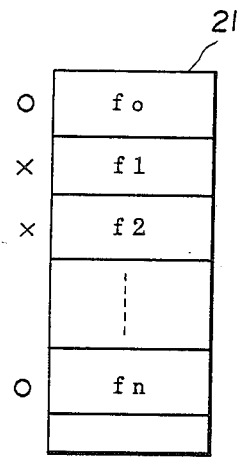
FIGS. 20A through 20C are diagrams for explaining the storage of the image data in the fifth embodiment.

According to the reception process described above, the image data $f_1$ through $f_n$ of each of the frames within the one block which is received from the source are stored in the main memory 21 as shown in FIG. 20A.

A description will now be given of a case where a transmission error is detected in the image data $f_1$ and $f_2$. In this case, the retransmission of the frames $f_1$ and $f_2$ is made to the source and the source retransmits these frames $f_1$ and $f_2$. The retransmitted image data of one block are received similarly as described above, but the information "FCD" is detected and the discrimination result in the step 506 becomes YES. Hence, the process advances to the step 507 shown in FIG. 19B and the discrimination result in the step 508 becomes YES. A step 518 discriminates whether or not the read frame number coincides with the frame number which was requested retransmission.

When the discrimination result in the step 518 is YES, a step 519 discriminates the storage location of the image data corresponding to the frame number within the main memory 21. Then, a step 520 transfers the previous image data which is previously stored at the same storage location as the discriminated storage location to the sub memory 22. A step 521 stores the image data which is received this time at the same storage location of the main memory 21. Thereafter, the process advances to the step 510 described before to make an error check and to set the error frame data in the step 511 if necessary.

On the other hand, when the discrimination result in the step 518 is NO, the process advances to the step 517 shown in FIG. 19A. In this case, the steps 510 through 511 are not carried out and the detection state is cleared to the initial state, because it is regarded that the data of the frame number is in error. Thus, the retransmission process is made in this case.

Figure 20B:
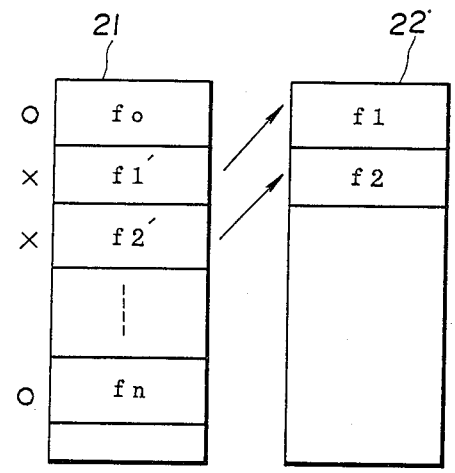
Figure 20C:
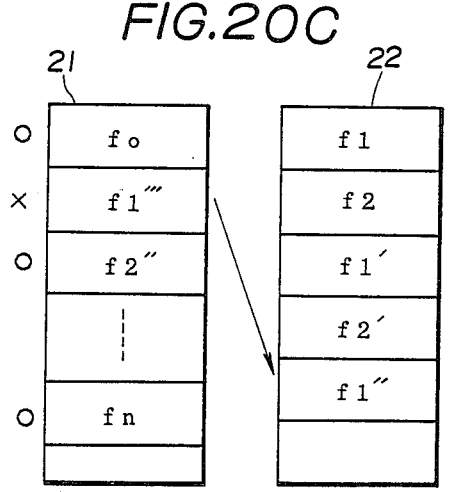

Accordingly, the frames containing the transmission error are retransmitted in response to the retransmission request as shown in FIG. 20B. The previously received image data $f_1$ and $f_2$ are transferred to the sub memory 22, and the retransmitted image data $f_1'$ and $f_2'$ received by the first retransmission are stored in a predetermined storage location of the main memory 21. When a transmission error again exists in the received image data $f_1'$ and $f_2'$, a retransmission request is made and retransmitted image data $f_1''$ and $f_2''$ are similarly received by the second retransmission. Further, when a transmission error exists in the received image data $f_1''$ and $f_2''$, a retransmission request is made and retransmitted image data $f_1'''$ and $f_2'''$ are similarly received by the third retransmission. Therefore, the image data $f_1$, $f_2$, $f_1'$, $f_2'$, $f_1''$ and $f_2''$ received previously are sequentially stored in the sub memory 22 as shown in FIG. 20C. When the limit of the retransmission is set to three times, the step 515 shown in FIG. 19A discriminates that another retransmission is not possible and the retransmission process is ended.

Figure 21A:
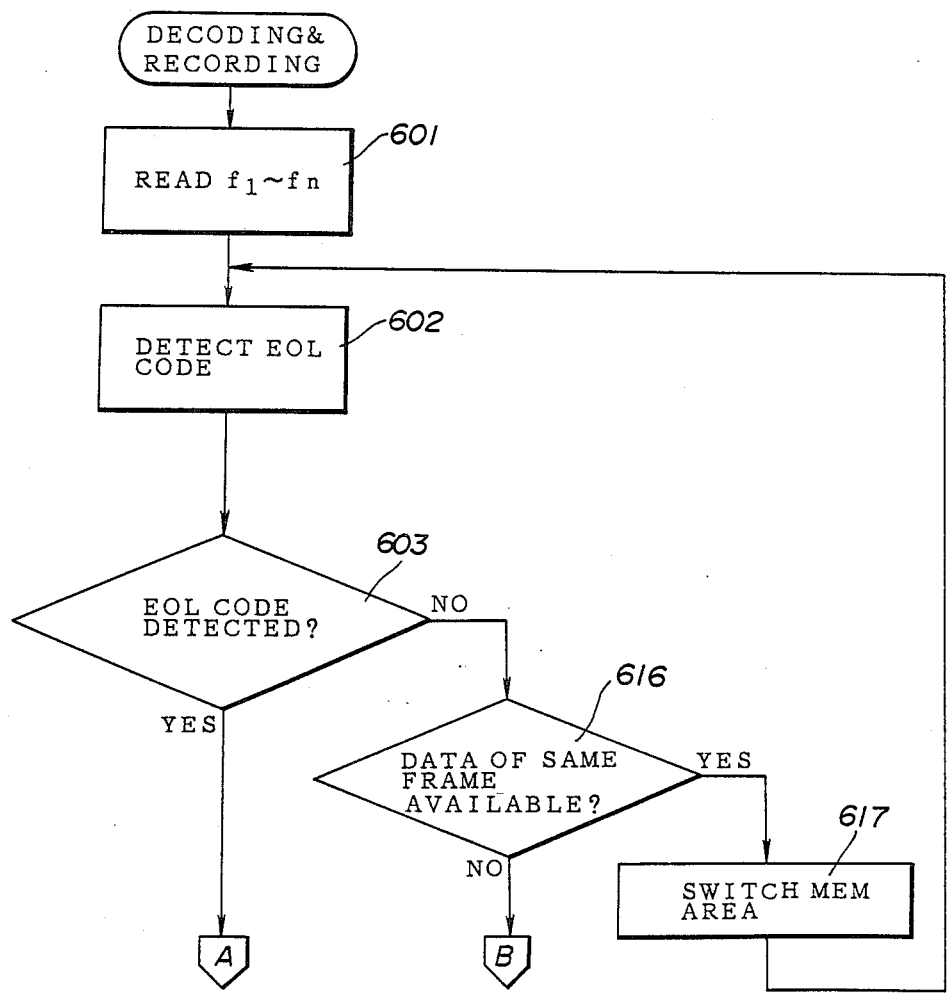
FIGS. 21A and 21B respectively are flow charts for explaining an operation of the system control part for carrying out a decoding and recording process in the fifth embodiment.
Figure 21B:
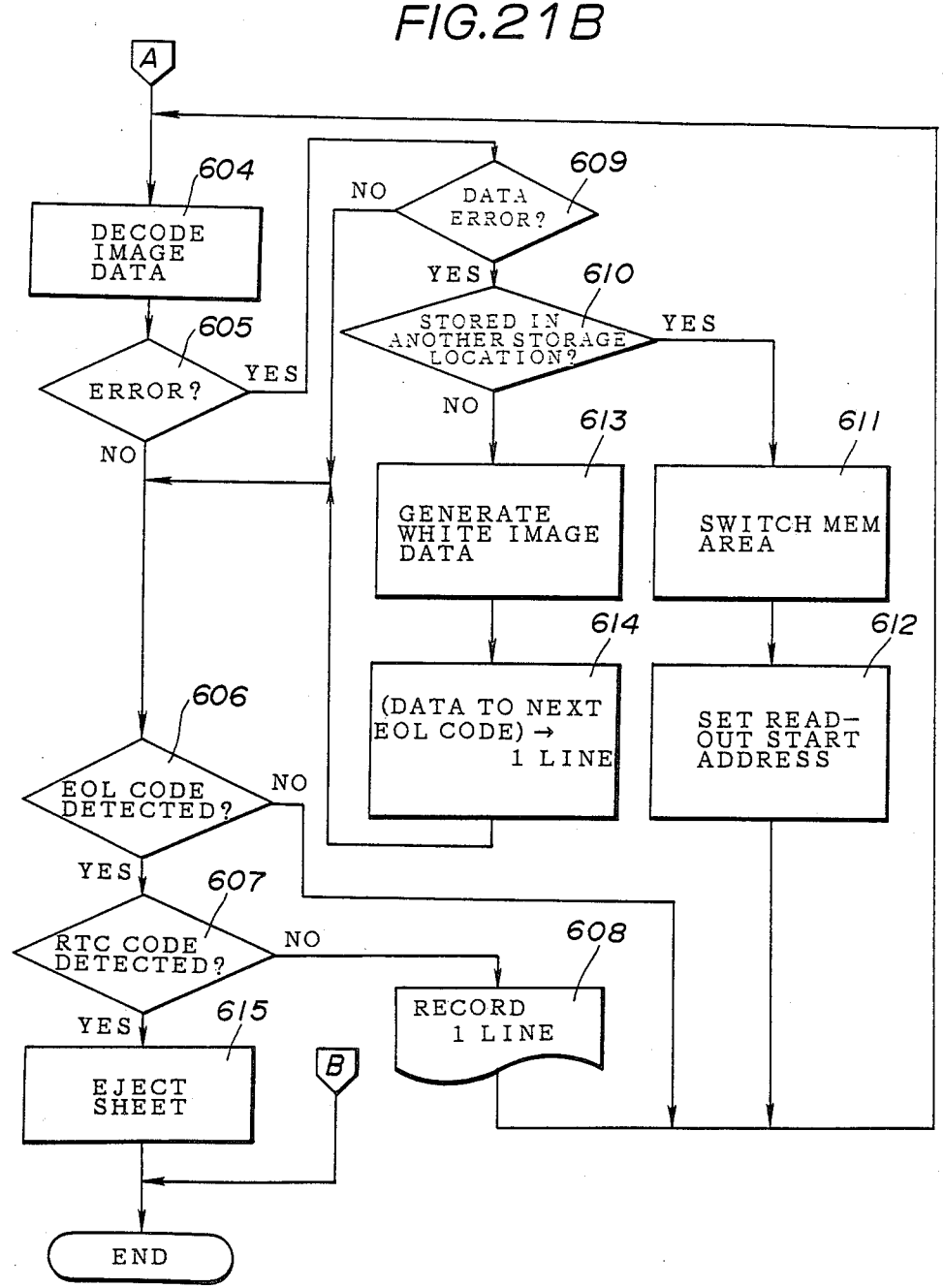

When the reception process described above is ended, a decoding and recording process is carried out in accordance with flow charts shown in FIGS. 21A and 21B. FIGS. 21A and 21B show the flow charts for explaining an operation of the system control part 18 for carrying out the decoding and recording process in the fifth embodiment when the facsimile machine 1A is the destination.

In FIG. 21A, a step 601 successively reads out the image data $f_1$ through $f_n$ of each of the frames stored in the main memory 21. The EOL code indicating the end of the line is added to the image data as described before, and the image data is constituted by the make up code and the termination code when it is assumed that the MH coding scheme is employed as the data compression (or encoding) system. Hence, a step 602 detects the EOL code which indicates the start of one line of image data. A step 603 discriminates whether or not the EOL code is detected, and a step 604 shown in FIG. 21B successively decodes the coded image data by a code conversion using a code table in units of codes.

Then, a step 605 discriminates whether or not the frame of the image data which is being decoded contains a transmission error by referring to the error frame data described before. When the discrimination result in the step 605 is NO, a step 606 discriminates whether or not the EOL code is detected, and the process returns to the step 604 when the discrimination result in the step 606 is NO.

When the decoding of the image data amounting to one line is completed, the next EOL code is detected. Because the RTC code indicating the end of the image data of one block is the same as six successive EOL codes, a step 607 discriminates whether or not the RTC code is detected when the discrimination result in the step 606 becomes YES. When the discrimination result in the step 607 is NO, a step 608 records the decoded image data amounting to one line on the plotter 12 and the process returns to the step 604 to carry out a similar process with respect to the next line.

In FIG. 20C described before, the image data $f_0$ contains no transmission error. Hence, by repeating the above described process, one frame of the received image is recorded on the plotter 12. On the other hand, the image data $f_1'''$ of the first frame contains the transmission error. This transmission error exists in the EOL code, the make up code, the termination code and the like. For this reason, when carrying out the decoding, the following cases are judged as data errors. In other words, it is judged that the data error exists when the above described codes have an undefined bit pattern, when the make up code is continuous, when the EOL code comes next to the make up code, and when a predetermined number of bits is not obtainable by decoding the image data amounting to one line sandwiched between two EOL codes.

Accordingly, when the discrimination result in the step 605 is YES after the decoding in the step 604, a step 609 discriminates whether or not a data error exists. The process advances to the step 606 when the discrimination result in the step 609 is NO.

Figure 22:
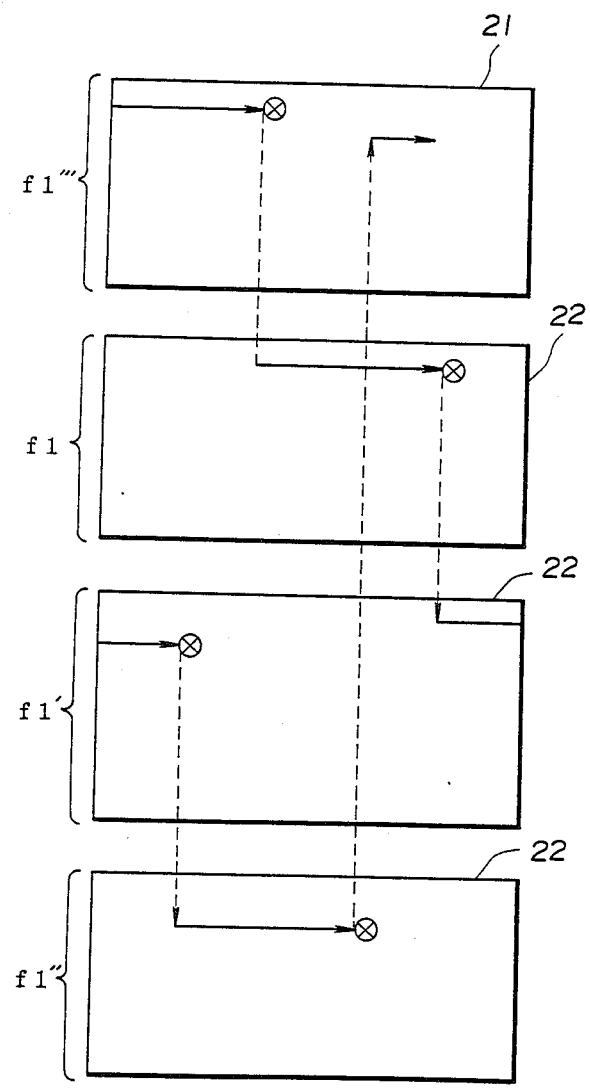
FIG. 22 is a diagram for explaining a switching of a memory area in the fifth embodiment.
Figure 23:
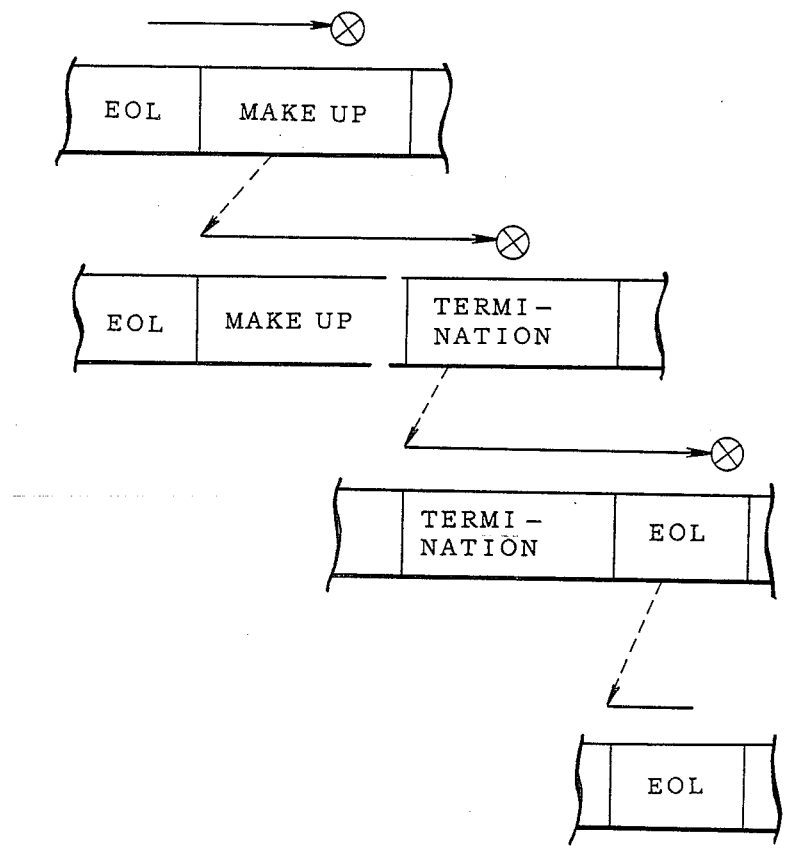
FIG. 23 is a diagram for explaining a read-out position of a next image data after the switching of the memory area.

In this embodiment, every time the image data is received by the retransmission, the previously received image data is transferred and stored in the sub memory 22 as shown in FIG. 20C. Hence, when the discrimination result in the step 609 is YES, a step 610 discriminates whether or not the image data of the frame is stored in another storage location. In this embodiment, the image data $f_1'''$ stored in the main memory 21 is decoded and the previously received image data $f_1$, $f_1p'$ and $f_1''$ of this frame are stored in the sub memory 22. That is, the discrimination result in the step 610 is YES, and a step 611 switches a read-out memory area from the main memory 21 to the sub memory 22 so as to read out the image data $f_1$ stored in the sub memory 22 in place of the image data f''' a shown in FIG. 22. When an error is detected in the codes in the memory area before the switching of the memory area, a step 612 sets a read-out start address so that the read-out from the switched read-out memory area starts again from the same code as shown in FIG. 23. In addition, when the predetermined number of bits is not obtainable by decoding the image data amounting to one line sandwiched between two EOL codes, the step 612 sets the read-out start address so that the read-out starts again from a previous EOL code. The process returns to the step 604 after the step 612.

Therefore, when another error is detected in the image data fl, for example, the next image data $f_1'$ is read out and processed. In other words, another previously received image data is read out and processed every time an error is detected. In addition, the image data $f_1'''$ is processed again when an error is detected in the image data $f_1''$. When the error exists in the same code or the same line of the image data $f_1$, $f_1''$, $f_1''$ and $f_1'''$, the switching of the memory area makes one round and no other memory area becomes available for the switching. The discrimination result in the step 610 is NO in this case, and a step 613 generates white image data amounting to one line an a step 614 regards the image data to the next EOL code as being the image data of one line. The process advances to the step 606 after the step 614. As a result, a white line (blank or space) is recorded when the same line of the image data $f_1$, $f_1'$, $f_1''$ and $f_1'''$ contains the error.

When the image data $f_1$ through $f_n$ of each of the frames are recorded and the RTC code is detected, the discrimination result in the step 607 becomes YES and the process advances to a step 615. The step 615 cuts the recording sheet and ejects the recording sheet recorded with the received image in a case where a roll of the recording sheet is used. The step 615 simply ejects one recording sheet recorded with the received image in a case where cut recording sheets are used. The decoding and recording process ends after the step 615.

On the other hand, when the first EOL code indicating the start of the image data is not detected and the discrimination result in the step 603 is NO in FIG. 21A, a step 616 discriminates whether or not another image data of the same frame is available. A step 617 switches the read-out memory area so as to read out this other image data of the same frame from another memory area when the discrimination result in the step 616 is YES, and the process returns to the step 602. But when the discrimination result in the step 616 is NO, the process is ended.

When receiving the image data in response to the retransmission request made in this embodiment, the previously received image data including the image data containing the error are all stored in the respective memory areas of the sub memory 22. And, when an error is detected during the process of successively decoding and recording the received image data, the read-out memory area is switched to another memory area so as to read out the image data of the same frame received previously. Normally, the transmission error in each of the received image data occurs at different bit positions. For this reason, it is usually possible to read out a correct image data by the switching the read-out memory area, and the dropout and length reduction of the recorded image is virtually eliminated because it is possible to successively decode and record the correct image data.

The switching of the read-out memory area in this embodiment takes place when an error is detected during the decoding process. However, one memory area may be taken as a reference memory area and an error detected in the reference memory area may be corrected by using the corresponding image data read out from other memory areas.

Next, a description will be given of a sixth embodiment of the facsimile machine according to the present invention. The block system shown in FIG. 17 can also be employed in this sixth embodiment.

The transmission process of this embodiment is the same as that of the fifth embodiment, and a description thereof will be omitted.

Figure 24:
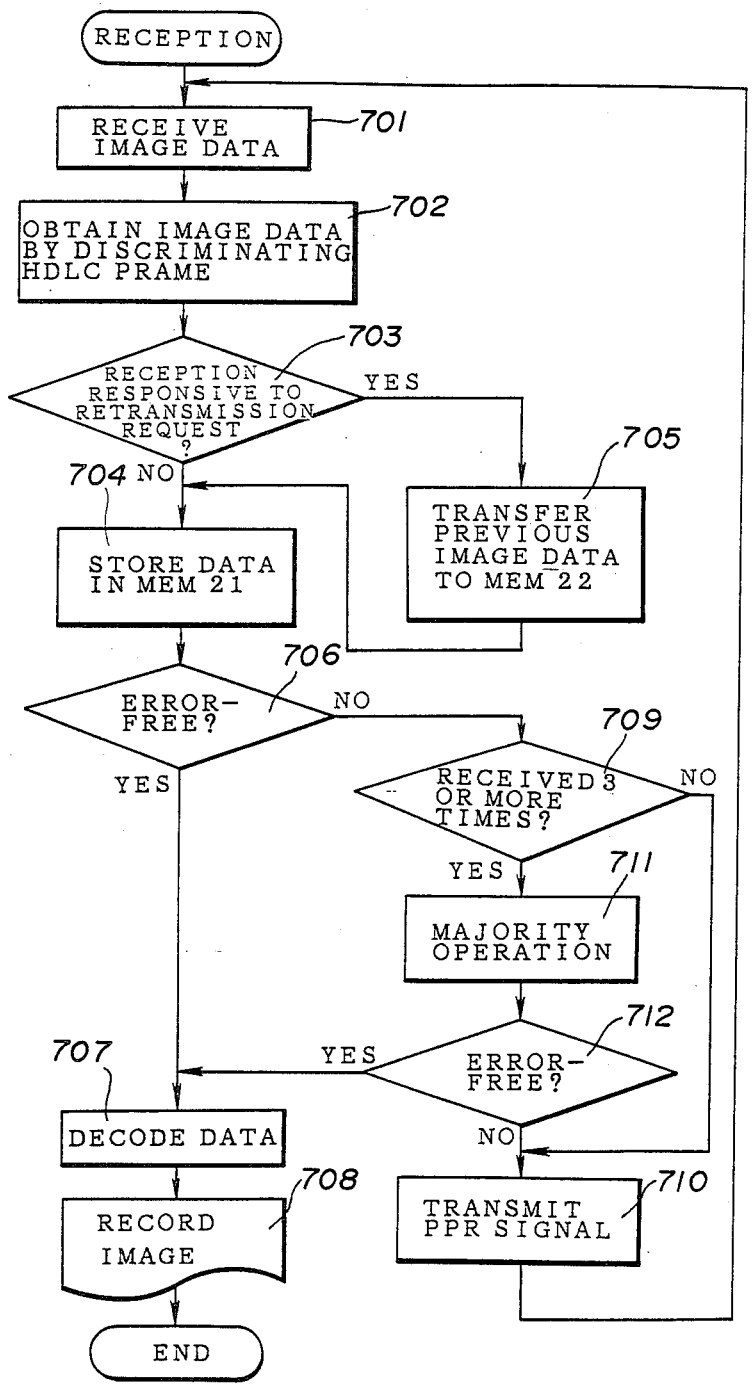
FIG. 24 is a flow chart for explaining an operation of the system control part for carrying out a reception process in a sixth embodiment of the facsimile machine according to the present invention.

FIG. 24 shows a flow chart for explaining an operation of the system control part 18 for carrying out a reception process in the sixth embodiment when the facsimile machine 1A is the destination. In FIG. 24, a step 701 receives the image data transmitted from the source, and a step 702 discriminates each field of the HDLC frame and obtains the received image data similarly to the process shown in FIG. 19A. A step 703 discriminates whether or not the received image data is obtained in response to the retransmission request. When the discrimination result in the step 703 is NO, a step 704 stores the received image data into the main memory 21. In addition, when the discrimination result in the step 703 is YES, a step 705 transfers the previously received image data of the same frame to the sub memory 22 and the step 704 stores the image data received this time into a predetermined memory area of the main memory 21. Hence, the image data of all of the received frames are stored in the memories 21 and 22 as described before in conjunction with FIGS. 20A through 20C.

A step 706 discriminates whether or not the image data of the received frame is error-free, that is, no transmission error exists, by checking the CRC code. When no transmission error exists and the discrimination result in the step 706 is YES, a step 707 successively decodes the received image data of one block starting from the first frame and a step 708 successively records the received image onto the recording sheet on the plotter 12.

On the other hand, when the discrimination result in the step 706 is NO, a step 709 discriminates whether or not the image data of the same frame is received three or more times. When the image data of the same frame is received less than three times and the discrimination result in the step 709 is NO, a step 710 transmits the PPR signal and requests retransmission to the source, and the process returns to the step 701 to receive the retransmitted image data.

Figure 25:
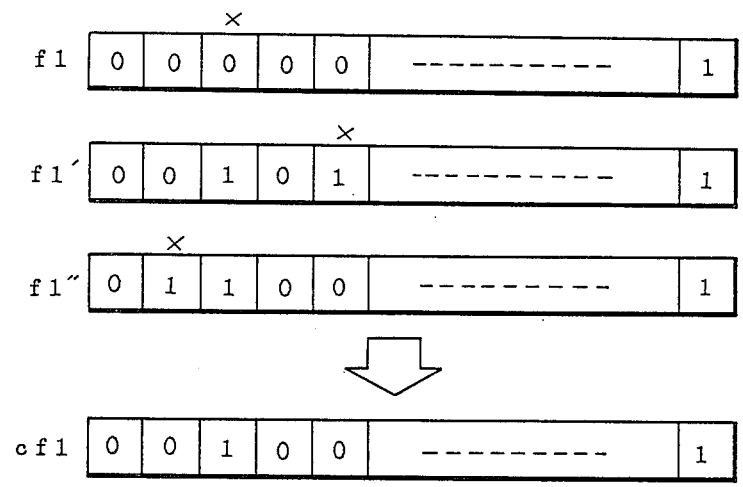
FIG. 25 is a diagram for explaining a majority operation carried out in the sixth embodiment.

As in the case of the fifth embodiment, it is assumed for convenience' sake that a transmission error occurs in the image data $f_1$ of one frame and a transmission error also occurs in each of the retransmitted image data $f_1'$ and $f_1$. When the image data of the same frame containing the transmission error is received three or more times, the discrimination result in the step 709 becomes YES. In this case, a step 711 reads out the image data $f_1$, $f_1'$ and $f_1''$ which all contain the transmission error even though the retransmissions are made and compares corresponding bits of these image data $f_1$, $f_1'$ and $f_1''$ as shown in FIG. 25. In FIG. 25, a bit marked "X" indicates an erroneous bit. When the values of corresponding bits coincide in each of the image data $f_1$, $f_1'$ and $f_1''$, this value is used as a value of a corresponding bit of a corrected image data $cf_1$. On the other hand, when the values of the corresponding bits of the image data $f_1$, $f_1'$ and $f_1''$ do not coincide, a majority operation is carried out and a value obtained by the majority operation is used as the value of the corresponding bit of the corrected image data $cf_1$.

Next, a step 712 discriminates whether or not the corrected image data $cf_1$ is error-free by checking the CRC code. When the discrimination result in the step 712 is NO, the process advances to the step 707. On the other hand, a step 710 makes a retransmission request to the source when the discrimination result in the step 712 is NO, and the process returns to the step 701 to receive the retransmitted image data.

After the fourth image data $f_1'''$ (third retransmission) is received, the majority operation is similarly carried out with the three image data $f_1'$, $f_1''$ and $f_1'''$ to obtain the corrected image data $cf_1$. This corrected image data $cf_1$ is recorded on the plotter 12 when no error exists therein.

Therefore, when the retransmission requests are made and the image data of the same frame is obtained three or more times this embodiment, the majority operation is carried out on the corresponding bits of the three or more image data of the same frame so as to generate the corrected image data of the same frame reflecting the results of the majority operation. Accordingly, even when the number of retransmissions is limited to three, for example, it is possible to obtain a corrected image data which is correct as long as the corresponding bits of the three previously received image data of the same frame are not in error. Consequently, the dropout and length reduction of the recorded image is virtually eliminated because it is possible to successively decode and record the correct image data.

In this embodiment, the majority operation is carried out every time the image data of the same frame is received three times, but this number is of course not limited to three. In addition, it is possible to carry out the majority operation after the last retransmission is made using all of the image data of the same frame received up to that time. Furthermore, although this embodiment checks the corrected image data using the CRC code, the CRC code itself may the in error and it is hence possible to similarly carry out the majority operation on the received CRC codes.

In the described embodiments, the image data is transmitted in the ECM in conformance with the Group III standard, but the present invention is also similarly applicable to cases where the same image data is retransmitted upon request.

Further, the present invention is not limited to these embodiments, but various variations and modifications ma be made without departing from the scope of the present invention.

What is claimed is:

1. A facsimile machine comprising:

modem means coupled to a data transmission path for modulating a transmitting image data which is transmitted to the data transmission path and for demodulating received image data which is received from the data transmission path, said transmitting image data and said received image data being transmitted and received in frames respectively including image data related to a plurality of lines and error correction codes for use in detecting an error in the image data of each of the lines;

communication control means coupled to said modem means for controlling communications to and from the data transmission path;

reading means for reading a document image which is to be transmitted and for outputting the transmitting image data describing the document image;

recording means for recording an image described by the received image data onto a recording sheet;

memory means for temporarily storing the transmitting image data and the received image data; and system control means for controlling operations of said communication control means, said reading means and said recording means, said system control means including first error detecting means for detecting an error in the received image data related to an arbitrary frame by detecting the error correction code, discriminating means for discriminating whether or not a retransmission request of said arbitrary frame is permitted, retransmission means for controlling said communication control means to output a retransmission request only when said discriminating means discriminates that the retransmission request is permitted, second error detecting means for detecting whether or not a data error exists in the image data related to the lines within said arbitrary frame for each of the lines within said arbitrary frame when said discriminating means discriminates that the retransmission is not permitted, and enabling means for enabling said recording means to record the image data related to each of the lines in which no data error is detected in said second error detecting means, so that the image data related to said arbitrary frame is recorded on said recording means even when an error is detected therein.

2. The facsimile machine as claimed in claim 1 wherein said system control means further includes means for supplying a predetermined image data amounting to one line for recording on said recording means in place of each of the lines in which the data error is detected in said second error detecting means.

3. The facsimile machine as claimed in claim 1 wherein said discriminating means includes detecting means for detecting a number of retransmission requests made, and means for discriminating that the retransmission request is permitted when a number of retransmission requests made detected in said detecting means is less than a predetermined number.

4. The facsimile machine as claimed in claim 1 wherein said transmitting image data and said received image data are in conformance with an error correction mode (ECM) of a Group III standard recommended by CCITT.

5. The facsimile machine as claimed in claim 1 wherein said transmitting image data and said received image data are transmitted and received in frames with a data format of a high level data link control (HDLC).

6. The facsimile machine as claimed in claim 5 wherein a number of bytes set in one high level data link control (HDLC) frame is selected from a group including 256 bytes, 64 bytes and 32 bytes.

7. The facsimile machine as claimed in claim 1 wherein said data transmission path is a transmission line 8. The facsimile machine as claimed in claim 1 wherein said data transmission path is a radio line.

9. The facsimile machine as claimed in claim 8 wherein said transmitting image data and said received image data are transmitted and received in frames with a data format of a high level data link control (HDLC), and a number of bytes set in one high level data link control (HDLC) frame is less than 64 bytes.

10. The facsimile machine as claimed in claim 1 wherein said transmitting image data and said received image data are respectively transmitted and received in blocks made up of a predetermined number of frames, each of the blocks corresponding to one page of the document image.

11. The facsimile machine as claimed in claim 1 wherein said transmitting image data and said received image data are respectively transmitted and received in blocks made up of a predetermined number of frames, each of the blocks corresponding to one partial page of the document image.

12. The facsimile machine as claimed in claim 11 wherein said system control means further includes first counting means for counting a number of retransmission requests received, second counting means for counting a number of retransmission requests made, first disabling means for disabling a retransmission to be made when the number in said first counting means reaches a predetermined value, said discriminating means including means for discriminating that the retransmission request is permitted when the number in said second counting means is less than said predetermined value, page discriminating means for discriminating whether or not one block of the received image data relates to a last partial page of the document image, and second disabling means for disabling said retransmission means by prohibiting a retransmission request to be made when the number in said second counting means is one less than said predetermined value and said page discriminating means discriminates that one block of the received image data does not relate to the last partial page of the document image, so that a next block of the image data is received.

13. The facsimile machine as claimed in claim 12 wherein said system control means further includes means for transmitting a reception error signal which indicates that a data error occurred during a reception of blocks of the image data corresponding to one page of the document image after one block of the image data related to the last partial page of the document image is received and when said second disabling means has disabled said retransmission means during reception of the block immediately preceding the last block.

14. The facsimile machine as claimed in claim 1 wherein said memory means stores the received image data related to a frame and image data related to the same frame and received in response to each retransmission request until one of the image data related to the same frame is read out and recorded on said recording means, and said system control means further includes means for reading out from said memory means portions of the image data related to the same frame in which no error is detected by said first error detecting means for being recorded on said recording means when the retransmission is ended before an error-free image data is received and detected by said first error detecting means.

15. The facsimile machine as claimed in claim 14 wherein said transmitting image data and said received image data are transmitted and received in frames with a data format of a high level data link control (HDLC).

16. The facsimile machine as claimed in claim 15 wherein a number of bytes set in one high level data link control (HDLC) frame is selected from a group including 256 bytes, 64 bytes and 32 bytes.

17. The facsimile machine as claimed in claim 15 wherein the image data related to one frame contains image data describing one line of the document image.

18. The facsimile machine as claimed in claim 1 wherein said memory means stores the received image data related to a frame and image data related to the same frame and received in response to each retransmission request, and said system control means further includes correcting means for correcting errors in the image data stored in said memory means and for outputting a corrected image data related to the same frame for being recorded on said recording means when the retransmission is ended before an error-free image data is received and detected by said first error detecting means.

19. The facsimile machine as claimed in claim 18 wherein said correcting means includes means for carrying out a majority operation on corresponding bits of the image data related to the same frame stored in said memory means so as to obtain the corrected image data related to the same frame.

20. The facsimile machine as claimed in claim 18 wherein said transmitting image data and said received image data are transmitted and received in frames with a data format of a high level data link control (HDLC).

21. The facsimile machine as claimed in claim 20 wherein a number of bytes set in one high level data link control (HDLC) frame is selected from a group including 256 bytes, 64 bytes and 32 bytes.

22. The facsimile machine as claimed in claim 20 wherein the image data related to one frame contains image data describing one line of the document image.

23. The facsimile machine as claimed in claim 1 which further comprises encoding and decoding means for encoding the transmitting image data before transmission from said modem means and for decoding the received image data before recording on said recording means.

* * * * *